US007970779B2

(12) United States Patent
Smirnov et al.

(10) Patent No.: US 7,970,779 B2
(45) Date of Patent: Jun. 28, 2011

(54) APPLICATION INTERFACE INCLUDING DYNAMIC TRANSFORM DEFINITIONS

(75) Inventors: Dmitry M. Smirnov, Munich (DE); Ralf Schroeder, Munich (DE)

(73) Assignee: Oracle International Corporation, Redwood Shores, CA (US)

( * ) Notice: Subject to any disclaimer, the term of this patent is extended or adjusted under 35 U.S.C. 154(b) by 1673 days.

(21) Appl. No.: 10/661,167

(22) Filed: Sep. 12, 2003

(65) Prior Publication Data

US 2007/0174852 A1 Jul. 26, 2007

(51) Int. Cl.
*G06F 17/20* (2006.01)
*G06F 15/16* (2006.01)

(52) U.S. Cl. ........................................ 707/756; 707/809

(58) Field of Classification Search .................. 707/756, 707/809

See application file for complete search history.

(56) References Cited

U.S. PATENT DOCUMENTS 6,850,947 B1 * 2/2005 Chung et al. .................. 707/101
2002/0129024 A1 * 9/2002 Lee .................................. 707/10
2003/0056203 A1 * 3/2003 Micco et al. .................. 717/137

* cited by examiner

*Primary Examiner* — John Breene
*Assistant Examiner* — Alex Gofman
(74) *Attorney, Agent, or Firm* — Kilpatrick Townsend & Stockton LLP

(57) ABSTRACT

An application programming interface configured to transform data responsive to a transform process definition. The transform process definition is interpreted concurrently with the transformation process. This interpretation dynamically determines navigation within, and processing of, the data to be transformed. Under control of the transform process definition, a transform engine is configured to transform input data using recursive calls to a transformation process. The recursive approach is responsive to data structures within the transform process definition and simplifies operations such as parallel processing, load-balancing of transformation tasks, nesting, un-nesting, filtering, and the like.

17 Claims, 15 Drawing Sheets

| Line | Data To Be Transformed |
|---|---|
| 1 | - <PERSON_BASIC_FULLSYNC> |
| 2 | - <FieldTypes> |
| 3 | - <PERSON class="**R**"> |
| 4 | <EMPLID type="**CHAR**" /> |
| 5 | <PER_STATUS type="**CHAR**" /> |
| 6 | <BIRTHDATE type="**DATE**" /> |
| 7 | <BIRTHPLACE type="**CHAR**" /> |
| 8 | <BIRTHCOUNTRY type="**CHAR**" /> |
| 9 | <BIRTHSTATE type="**CHAR**" /> |
| 10 | <DT_OF_DEATH type="**DATE**" /> |
| 11 | <ORIG_HIRE_DT type="**DATE**" /> |
| 12 | <HIGHLY_COMP_EMPL_C type="**CHAR**" /> |
| 13 | <HIGHLY_COMP_EMPL_P type="**CHAR**" /> |
| 14 | </PERSON> |
| 15 | - <EMAIL_ADDRESSES class="**R**"> |
| 16 | <EMPLID type="**CHAR**" /> |
| 17 | <E_ADDR_TYPE type="**CHAR**" /> |
| 18 | <EMAIL_ADDR type="**CHAR**" /> |
| 19 | </EMAIL_ADDRESSES> |
| 20 | - <PERSONAL_PHONE class="**R**"> |
| 21 | <EMPLID type="**CHAR**" /> |
| 22 | <PHONE_NUMBER type="**CHAR**" /> |
| 23 | </PERSONAL_PHONE> |
| 24 | - <PERS_DATA_EFFDT class="**R**"> |
| 25 | <EMPLID type="**CHAR**" /> |
| 26 | <EFFDT type="**DATE**" /> |
| 27 | <PER_TYPE type="**CHAR**" /> |
| 28 | <MAR_STATUS type="**CHAR**" /> |
| 29 | <MAR_STATUS_DT type="**DATE**" /> |
| 30 | <SEX type="**CHAR**" /> |
| 31 | <AGE_STATUS type="**CHAR**" /> |
| 32 | <HIGHEST_EDUC_LVL type="**CHAR**" /> |
| 33 | <FT_STUDENT type="**CHAR**" /> |
| 34 | <LANG_CD type="**CHAR**" /> |
| 35 | <YEARS_OF_EXP type="**NUMBER**" /> |
| 36 | <APPLID type="**CHAR**" /> |
| 37 | <APP_DT type="**DATE**" /> |
| 38 | <ALTER_EMPLID type="**CHAR**" /> |
| 39 | <BILINGUALISM_CODE type="**CHAR**" /> |
| 40 | <HEALTH_CARE_NBR type="**CHAR**" /> |
| 41 | <HEALTH_CARE_STATE type="**CHAR**" /> |
| 42 | <GUARDIAN_CHE type="**CHAR**" /> |
| 43 | <MILIT_SITUATN_ESP type="**CHAR**" /> |
| 44 | <SOC_SEC_AFF_DT type="**DATE**" /> |
| 45 | <GVT_CRED_MIL_SVCE type="**CHAR**" /> |
| 46 | <GVT_MILITARY_COMP type="**CHAR**" /> |
| 47 | <GVT_MIL_GRADE type="**CHAR**" /> |
| 48 | <GVT_MIL_RESRVE_CAT type="**CHAR**" /> |
| 49 | <GVT_VET_PREF_RIF type="**CHAR**" /> |
| 50 | <ETHNIC_GROUP type="**CHAR**" /> |
| 51 | <GVT_DISABILITY_CD type="**CHAR**" /> |
| 52 | <GVT_CURR_AGCY_EMPL type="**CHAR**" /> |
| 53 | <GVT_CURR_FED_EMPL type="**CHAR**" /> |
| 54 | <GVT_HIGH_PAY_PLAN type="**CHAR**" /> |
| 55 | <GVT_HIGH_GRADE type="**CHAR**" /> |

FIG. 3A

| Line | Data To Be Transformed – Continued |
|---|---|
| 56 | <GVT_TENURE type="**CHAR**" /> |
| 57 | <GVT_PAY_PLAN type="**CHAR**" /> |
| 58 | <BARG_UNIT type="**CHAR**" /> |
| 59 | <HR_RESPONSIBLE_ID type="**CHAR**" /> |
| 60 | <MILITARY_STAT_ITA type="**CHAR**" /> |
| 61 | <MILITARY_RANK_ITA type="**CHAR**" /> |
| 62 | <MILITARY_END_ITA type="**DATE**" /> |
| 63 | <US_WORK_ELIGIBILTY type="**CHAR**" /> |
| 64 | <MILITARY_STATUS type="**CHAR**" /> |
| 65 | <CITIZEN_PROOF1 type="**CHAR**" /> |
| 66 | <CITIZEN_PROOF2 type="**CHAR**" /> |
| 67 | <SMOKER type="**CHAR**" /> |
| 68 | <MEDICARE_ENTLD_DT type="**DATE**" /> |
| 69 | <SMOKER_DT type="**DATE**" /> |
| 70 | <FP_ACTION_2 type="**CHAR**" /> |
| 71 | <ACTION_REASON type="**CHAR**" /> |
| 72 | <FP_ACTION_REQ type="**CHAR**" /> |
| 73 | <FP_SUPDOC_REQ type="**CHAR**" /> |
| 74 | <LAST_UPDATE_DATE type="**DATE**" /> |
| 75 | </PERS_DATA_EFFDT> |
| 76 | - <NAMES class="**R**"> |
| 77 | <EMPLID type="**CHAR**" /> |
| 78 | <NAME_TYPE type="**CHAR**" /> |
| 79 | <EFFDT type="**DATE**" /> |
| 80 | <COUNTRY_NM_FORMAT type="**CHAR**" /> |
| 81 | <NAME type="**CHAR**" /> |
| 82 | <NAME_INITIALS type="**CHAR**" /> |
| 83 | <NAME_PREFIX type="**CHAR**" /> |
| 84 | <NAME_SUFFIX type="**CHAR**" /> |
| 85 | <NAME_ROYAL_PREFIX type="**CHAR**" /> |
| 86 | <NAME_ROYAL_SUFFIX type="**CHAR**" /> |
| 87 | <NAME_TITLE type="**CHAR**" /> |
| 88 | <LAST_NAME_SRCH type="**CHAR**" /> |
| 89 | <FIRST_NAME_SRCH type="**CHAR**" /> |
| 90 | <LAST_NAME type="**CHAR**" /> |
| 91 | <FIRST_NAME type="**CHAR**" /> |
| 92 | <MIDDLE_NAME type="**CHAR**" /> |
| 93 | <SECOND_LAST_NAME type="**CHAR**" /> |
| 94 | <SECOND_LAST_SRCH type="**CHAR**" /> |
| 95 | <NAME_AC type="**CHAR**" /> |
| 96 | <PREF_FIRST_NAME type="**CHAR**" /> |
| 97 | <PARTNER_LAST_NAME type="**CHAR**" /> |
| 98 | <PARTNER_ROY_PREFIX type="**CHAR**" /> |
| 99 | <LAST_NAME_PREF_NLD type="**CHAR**" /> |
| 100 | </NAMES> |
| 101 | - <ADDRESSES class="**R**"> |
| 102 | <EMPLID type="**CHAR**" /> |
| 103 | <ADDRESS_TYPE type="**CHAR**" /> |
| 104 | <EFFDT type="**DATE**" /> |
| 105 | <EFF_STATUS type="**CHAR**" /> |
| 106 | <COUNTRY type="**CHAR**" /> |
| 107 | <ADDRESS1 type="**CHAR**" /> |
| 108 | <ADDRESS2 type="**CHAR**" /> |
| 109 | <CITY type="**CHAR**" /> |
| 110 | <NUM1 type="**CHAR**" /> |

FIG. 3B

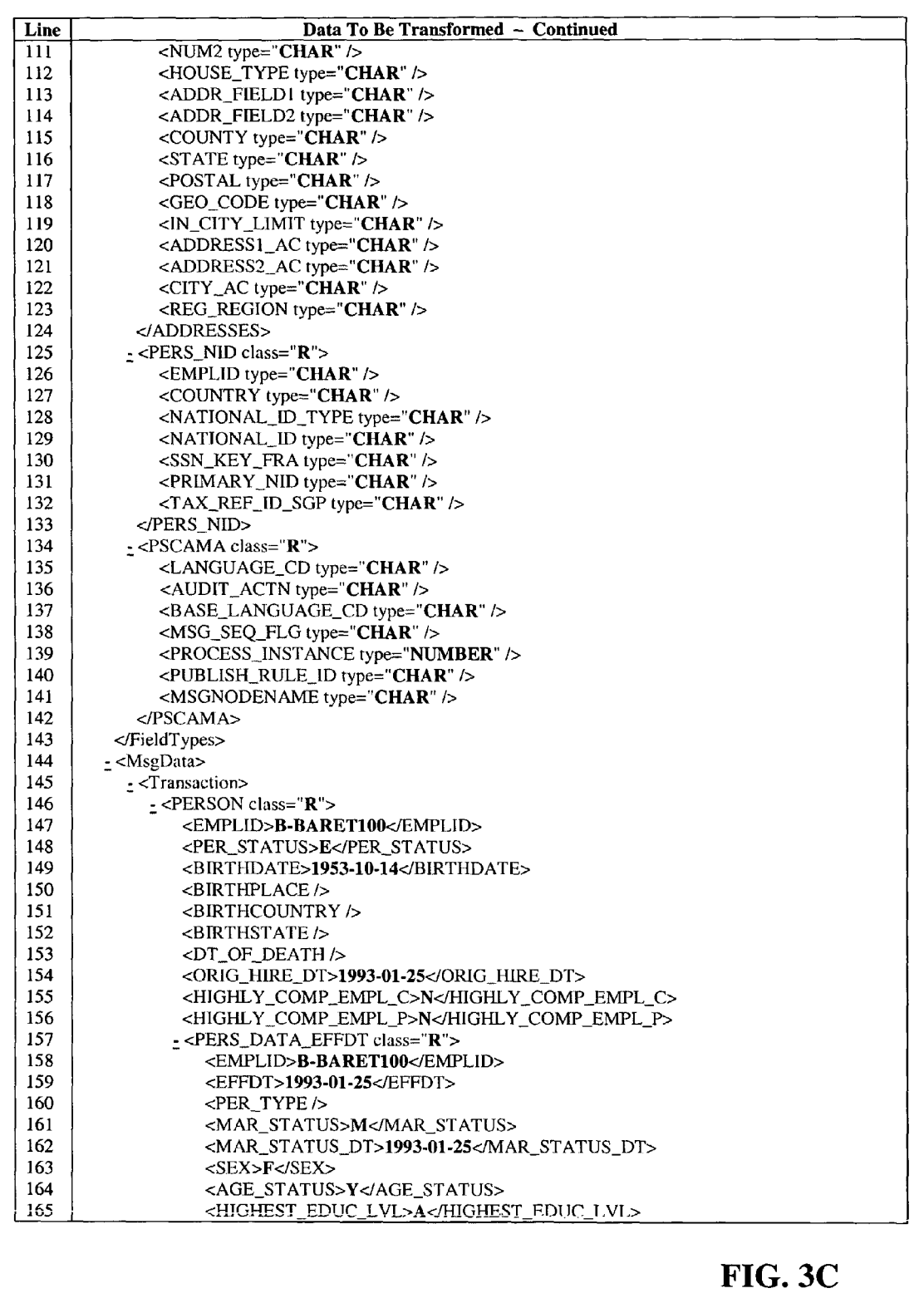

Data To Be Transformed ~ Continued

```
        <NUM2 type="CHAR" />
        <HOUSE_TYPE type="CHAR" />
        <ADDR_FIELD1 type="CHAR" />
        <ADDR_FIELD2 type="CHAR" />
        <COUNTY type="CHAR" />
        <STATE type="CHAR" />
        <POSTAL type="CHAR" />
        <GEO_CODE type="CHAR" />
        <IN_CITY_LIMIT type="CHAR" />
        <ADDRESS1_AC type="CHAR" />
        <ADDRESS2_AC type="CHAR" />
        <CITY_AC type="CHAR" />
        <REG_REGION type="CHAR" />
      </ADDRESSES>
    - <PERS_NID class="R">
        <EMPLID type="CHAR" />
        <COUNTRY type="CHAR" />
        <NATIONAL_ID_TYPE type="CHAR" />
        <NATIONAL_ID type="CHAR" />
        <SSN_KEY_FRA type="CHAR" />
        <PRIMARY_NID type="CHAR" />
        <TAX_REF_ID_SGP type="CHAR" />
      </PERS_NID>
    - <PSCAMA class="R">
        <LANGUAGE_CD type="CHAR" />
        <AUDIT_ACTN type="CHAR" />
        <BASE_LANGUAGE_CD type="CHAR" />
        <MSG_SEQ_FLG type="CHAR" />
        <PROCESS_INSTANCE type="NUMBER" />
        <PUBLISH_RULE_ID type="CHAR" />
        <MSGNODENAME type="CHAR" />
      </PSCAMA>
    </FieldTypes>
  - <MsgData>
    - <Transaction>
      - <PERSON class="R">
          <EMPLID>B-BARET100</EMPLID>
          <PER_STATUS>E</PER_STATUS>
          <BIRTHDATE>1953-10-14</BIRTHDATE>
          <BIRTHPLACE />
          <BIRTHCOUNTRY />
          <BIRTHSTATE />
          <DT_OF_DEATH />
          <ORIG_HIRE_DT>1993-01-25</ORIG_HIRE_DT>
          <HIGHLY_COMP_EMPL_C>N</HIGHLY_COMP_EMPL_C>
          <HIGHLY_COMP_EMPL_P>N</HIGHLY_COMP_EMPL_P>
        - <PERS_DATA_EFFDT class="R">
            <EMPLID>B-BARET100</EMPLID>
            <EFFDT>1993-01-25</EFFDT>
            <PER_TYPE />
            <MAR_STATUS>M</MAR_STATUS>
            <MAR_STATUS_DT>1993-01-25</MAR_STATUS_DT>
            <SEX>F</SEX>
            <AGE_STATUS>Y</AGE_STATUS>
            <HIGHEST_EDUC_LVL>A</HIGHEST_EDUC_LVL>
```

FIG. 3C

| Line | Data To Be Transformed - Continued |
|---|---|
| 166 | <FT_STUDENT>**N**</FT_STUDENT> |
| 167 | <LANG_CD /> |
| 168 | <YEARS_OF_EXP>**0**</YEARS_OF_EXP> |
| 169 | <APPLID /> |
| 170 | <APP_DT /> |
| 171 | <ALTER_EMPLID /> |
| 172 | <BILINGUALISM_CODE /> |
| 173 | <HEALTH_CARE_NBR /> |
| 174 | <HEALTH_CARE_STATE /> |
| 175 | <GUARDIAN_CHE /> |
| 176 | <MILIT_SITUATN_ESP /> |
| 177 | <SOC_SEC_AFF_DT /> |
| 178 | <GVT_CRED_MIL_SVCE /> |
| 179 | <GVT_MILITARY_COMP /> |
| 180 | <GVT_MIL_GRADE /> |
| 181 | <GVT_MIL_RESRVE_CAT /> |
| 182 | <ETHNIC_GROUP /> |
| 183 | <GVT_DISABILITY_CD>**05**</GVT_DISABILITY_CD> |
| 184 | <GVT_CURR_AGCY_EMPL>**N**</GVT_CURR_AGCY_EMPL> |
| 185 | <GVT_CURR_FED_EMPL>**N**</GVT_CURR_FED_EMPL> |
| 186 | <GVT_HIGH_PAY_PLAN /> |
| 187 | <GVT_HIGH_GRADE /> |
| 188 | <GVT_TENURE /> |
| 189 | <GVT_PAY_PLAN /> |
| 190 | <BARG_UNIT /> |
| 191 | <HR_RESPONSIBLE_ID /> |
| 192 | <MILITARY_STAT_ITA /> |
| 193 | <MILITARY_RANK_ITA /> |
| 194 | <MILITARY_END_ITA /> |
| 195 | <US_WORK_ELIGIBILTY>**Y**</US_WORK_ELIGIBILTY> |
| 196 | <MILITARY_STATUS>**1**</MILITARY_STATUS> |
| 197 | <CITIZEN_PROOF1 /> |
| 198 | <CITIZEN_PROOF2 /> |
| 199 | <SMOKER>**N**</SMOKER> |
| 200 | <MEDICARE_ENTLD_DT /> |
| 201 | <SMOKER_DT>**1993-01-25**</SMOKER_DT> |
| 202 | <FP_ACTION_2 /> |
| 203 | <ACTION_REASON /> |
| 204 | <FP_ACTION_REQ>**N**</FP_ACTION_REQ> |
| 205 | <FP_SUPDOC_REQ>**N**</FP_SUPDOC_REQ> |
| 206 | <LAST_UPDATE_DATE>**2001-05-25**</LAST_UPDATE_DATE> |
| 207 | </PERS_DATA_EFFDT> |
| 208 | - <PSCAMA class="**R**"> |
| 209 | <AUDIT_ACTN>**A**</AUDIT_ACTN> |
| 210 | </PSCAMA> |
| 211 | - <NAMES class="**R**"> |
| 212 | <EMPLID>**B-BARET100**</EMPLID> |
| 213 | <NAME_TYPE>**PRI**</NAME_TYPE> |
| 214 | <EFFDT>**1993-01-25**</EFFDT> |
| 215 | <COUNTRY_NM_FORMAT>**USA**</COUNTRY_NM_FORMAT> |
| 216 | <NAME>**Default,Tocurrent1**</NAME> |
| 217 | <NAME_INITIALS /> |
| 218 | <NAME_PREFIX /> |
| 219 | <NAME_SUFFIX /> |
| 220 | <NAME_ROYAL_PREFIX /> |

FIG. 3D

| Line | Data To Be Transformed – Continued |
|---|---|
| 221 | <NAME_ROYAL_SUFFIX /> |
| 222 | <NAME_TITLE /> |
| 223 | <LAST_NAME_SRCH>**DEFAULT**</LAST_NAME_SRCH> |
| 224 | <FIRST_NAME_SRCH>**TOCURRENT**</FIRST_NAME_SRCH> |
| 225 | <LAST_NAME>**Default**</LAST_NAME> |
| 226 | <FIRST_NAME>**Tocurrent1**</FIRST_NAME> |
| 227 | <MIDDLE_NAME /> |
| 228 | <SECOND_LAST_NAME /> |
| 229 | <SECOND_LAST_SRCH /> |
| 230 | <NAME_AC /> |
| 231 | <PREF_FIRST_NAME /> |
| 232 | <PARTNER_LAST_NAME /> |
| 233 | <PARTNER_ROY_PREFIX /> |
| 234 | <LAST_NAME_PREF_NLD>**1**</LAST_NAME_PREF_NLD> |
| 235 | </NAMES> |
| 236 | - <PSCAMA class="**R**"> |
| 237 | <AUDIT_ACTN>**A**</AUDIT_ACTN> |
| 238 | </PSCAMA> |
| 239 | - <ADDRESSES class="**R**"> |
| 240 | <EMPLID>**B-BARET100**</EMPLID> |
| 241 | <ADDRESS_TYPE>**HOME**</ADDRESS_TYPE> |
| 242 | <EFFDT>**1993-01-25**</EFFDT> |
| 243 | <EFF_STATUS>**A**</EFF_STATUS> |
| 244 | <COUNTRY>**USA**</COUNTRY> |
| 245 | <ADDRESS1>**12 Main St.**</ADDRESS1> |
| 246 | <ADDRESS2 /> |
| 247 | <CITY>**Pleasanton**</CITY> |
| 248 | <NUM1 /> |
| 249 | <NUM2 /> |
| 250 | <HOUSE_TYPE /> |
| 251 | <ADDR_FIELD1 /> |
| 252 | <ADDR_FIELD2 /> |
| 253 | <COUNTY /> |
| 254 | <STATE>**CA**</STATE> |
| 255 | <POSTAL>**94588**</POSTAL> |
| 256 | <GEO_CODE /> |
| 257 | <IN_CITY_LIMIT /> |
| 258 | <ADDRESS1_AC /> |
| 259 | <ADDRESS2_AC /> |
| 260 | <CITY_AC /> |
| 261 | <REG_REGION /> |
| 262 | </ADDRESSES> |
| 263 | - <PSCAMA class="**R**"> |
| 264 | <AUDIT_ACTN>**A**</AUDIT_ACTN> |
| 265 | </PSCAMA> |
| 266 | - <ADDRESSES class="**R**"> |
| 267 | <EMPLID>**B-BARET100**</EMPLID> |
| 268 | <ADDRESS_TYPE>**MAIL**</ADDRESS_TYPE> |
| 269 | <EFFDT>**1993-01-25**</EFFDT> |
| 270 | <EFF_STATUS>**A**</EFF_STATUS> |
| 271 | <COUNTRY>**USA**</COUNTRY> |
| 272 | <ADDRESS1>**12 Main St.**</ADDRESS1> |
| 273 | <ADDRESS2 /> |
| 274 | <CITY>**Pleasanton**</CITY> |
| 275 | <NUM1 /> |

FIG. 3E

| Line | Data To Be Transformed – Continued |
|---|---|
| 276 | <NUM2 /> |
| 277 | <HOUSE_TYPE /> |
| 278 | <ADDR_FIELD1 /> |
| 279 | <ADDR_FIELD2 /> |
| 280 | <COUNTY /> |
| 281 | <STATE>**CA**</STATE> |
| 282 | <POSTAL>**994588**</POSTAL> |
| 283 | <GEO_CODE /> |
| 284 | <IN_CITY_LIMIT /> |
| 285 | <ADDRESS1_AC /> |
| 286 | <ADDRESS2_AC /> |
| 287 | <CITY_AC /> |
| 288 | <REG_REGION /> |
| 289 | </ADDRESSES> |
| 290 | - <PSCAMA class="**R**"> |
| 291 | <AUDIT_ACTN>**A**</AUDIT_ACTN> |
| 292 | </PSCAMA> |
| 293 | - <PERS_NID class="**R**"> |
| 294 | <EMPLID>**B-BARET100**</EMPLID> |
| 295 | <COUNTRY>**USA**</COUNTRY> |
| 296 | <NATIONAL_ID_TYPE>**PR**</NATIONAL_ID_TYPE> |
| 297 | <NATIONAL_ID>**000999000**</NATIONAL_ID> |
| 298 | <SSN_KEY_FRA /> |
| 299 | <PRIMARY_NID>**Y**</PRIMARY_NID> |
| 300 | <TAX_REF_ID_SGP>**N**</TAX_REF_ID_SGP> |
| 301 | </PERS_NID> |
| 302 | - <PSCAMA class="**R**"> |
| 303 | <AUDIT_ACTN>**A**</AUDIT_ACTN> |
| 304 | </PSCAMA> |
| 325 | - <PERSONAL_PHONE class="**R**"> |
| 306 | <EMPLID>**B-BARET100**</EMPLID> |
| 307 | <PHONE_NUMBER>**800-380-7638**</PHONE_NUMBER> |
| 308 | </PERSONAL_PHONE> |
| 309 | - <PSCAMA class="**R**"> |
| 310 | <AUDIT_ACTN>**A**</AUDIT_ACTN> |
| 311 | </PSCAMA> |
| 312 | </PERSON> |
| 313 | - <PSCAMA class="**R**"> |
| 314 | <LANGUAGE_CD>**ENG**</LANGUAGE_CD> |
| 315 | <AUDIT_ACTN>**A**</AUDIT_ACTN> |
| 316 | <BASE_LANGUAGE_CD>**ENG**</BASE_LANGUAGE_CD> |
| 317 | <MSG_SEQ_FLG /> |
| 318 | <PROCESS_INSTANCE>**67**</PROCESS_INSTANCE> |
| 319 | <PUBLISH_RULE_ID>**PERSON_BASIC**</PUBLISH_RULE_ID> |
| 320 | <MSGNODENAME /> |
| 321 | </PSCAMA> |
| 322 | </Transaction> |
| 323 | </MsgData> |
| 324 | </PERSON_BASIC_FULLSYNC> |

FIG. 3F

| Line | Active XML |
|---|---|
| 1 | - <LM_TRANSFORMATION_PARAMETERS> |
| 2 | <transmission_type>**IA**</transmission_type> |
| 3 | <source_node>**PSFT_HR**</source_node> |
| 4 | <dest_node>**PSFT_LM**</dest_node> |
| 5 | <source_message_name>**PERSON_BASIC_FULLSYNC**</source_message_name> |
| 6 | <dest_message_name>**LM_PERSON_BASIC_FULLSYNC**</dest_message_name> |
| 7 | <source_message_version>**VERSION_2**</source_message_version> |
| 8 | <dest_message_version>**VERSION_2**</dest_message_version> |
| 9 | <application_release>**PeopleSoft HCM 8.8**</application_release> |
| 10 | </LM_TRANSFORMATION_PARAMETERS> |
| 11 | - <LM_TRANSFORMATION_SCHEMA> |
| 12 | - <transformation type="**IA**" application_release="**PeopleSoft HCM 8.8**" default_node="**PSFT_HR**"> |
| 13 | - <structure> |
| 14 | - <message message_name="**PERSON_BASIC_FULLSYNC**" |
| 15 | new_message_name="**LM_PERSON_BASIC_FULLSYNC**"> |
| 16 | - <LM_PERSON class="**R**" source_record="**PERSON**"> |
| 17 | <LM_PERSON_ID type="**CHAR**" source_field="**EMPLID**" /> |
| 18 | <LM_PER_STATUS type="**CHAR**" source_field="**PER_STATUS**" /> |
| 19 | <LM_BIRTHDATE type="**DATE**" source_field="**BIRTHDATE**" /> |
| 20 | <LM_COMM_METHOD type="**CHAR**" value="**EMAL**" /> |
| 21 | <LM_SOURCE_IND type="**CHAR**" value="**HRMS**" /> |
| 22 | <LM_EXT_PERSON_FLG type="**CHAR**" value="N" /> |
| 23 | <LM_HR_EMPLID type="**CHAR**" source_field="**EMPLID**" /> |
| 24 | <LM_ROW_ADDED_DTTM type="**DATETIME**" value="" /> |
| 25 | <LM_ROW_ADDED_OPRID type="**CHAR**" value="**PPLSOFT**" /> |
| 26 | <LM_ROW_MAINT_DTTM type="**DATETIME**" value="" /> |
| 27 | <LM_ROW_MAINT_OPRID type="**CHAR**" value="**PPLSOFT**" /> |
| 28 | - <LM_PERSON_EFFDT class="**R**" source_record="**PERS_DATA_EFFDT**"> |
| 29 | <LM_PERSON_ID type="**CHAR**" source_field="**EMPLID**" /> |
| 30 | <EFFDT type="**DATE**" source_field="**EFFDT**" /> |
| 31 | <LM_LANG_CD type="**CHAR**" source_field="**LANG_CD**" /> |
| 32 | <LM_SEX type="**CHAR**" source_field="**SEX**" /> |
| 33 | <LM_ROW_ADDED_DTTM type="**DATETIME**" value="" /> |
| 34 | <LM_ROW_ADDED_OPRID type="**CHAR**" value="**PPLSOFT**" /> |
| 35 | <LM_ROW_MAINT_DTTM type="**DATETIME**" value="" /> |
| 36 | <LM_ROW_MAINT_OPRID type="**CHAR**" value="**PPLSOFT**" /> |
| 37 | - <LM_PERSON_NAME class="**R**" source_record="**NAMES**"> |
| 38 | <LM_PERSON_ID type="**CHAR**" source_field="**EMPLID**" /> |
| 39 | <EFFDT type="**DATE**" source_field="**EFFDT**" /> |
| 40 | <LM_NAME_TYPE type="**CHAR**" source_field="**NAME_TYPE**" /> |
| 41 | <COUNTRY_NM_FORMAT type="**CHAR**" |
| 42 | source_field="**COUNTRY_NM_FORMAT**" /> |
| 43 | <NAME type="**CHAR**" source_field="**NAME**" /> |
| 44 | <NAME_INITIALS type="**CHAR**" source_field="**NAME_INITIALS**" /> |
| 45 | </LM_PERSON_NAME> |
| 46 | </LM_PERSON_EFFDT> |
| 47 | - <LM_PERSON_ADDR class="**R**" source_record="**ADDRESSES**"> |
| 48 | <LM_PERSON_ID type="**CHAR**" source_field="**EMPLID**" /> |
| 49 | <LM_CM_PURP_TYPE type="**CHAR**" source_field="**ADDRESS_TYPE**" /> |
| 50 | <EFFDT type="**DATE**" source_field="**EFFDT**" /> |
| 51 | <EFF_STATUS type="**CHAR**" source_field="**EFF_STATUS**" /> |
| 52 | <LM_PRIMARY type="**CHAR**" value="**N**" /> |
| 53 | <LM_PHONE type="**CHAR**" source_field="**PHONE_NUMBER**" |
| 54 | source_record="**PERSONAL_PHONE**" /> |
| 55 | <COUNTRY type="**CHAR**" source_field="**COUNTRY**" |

FIG. 4A

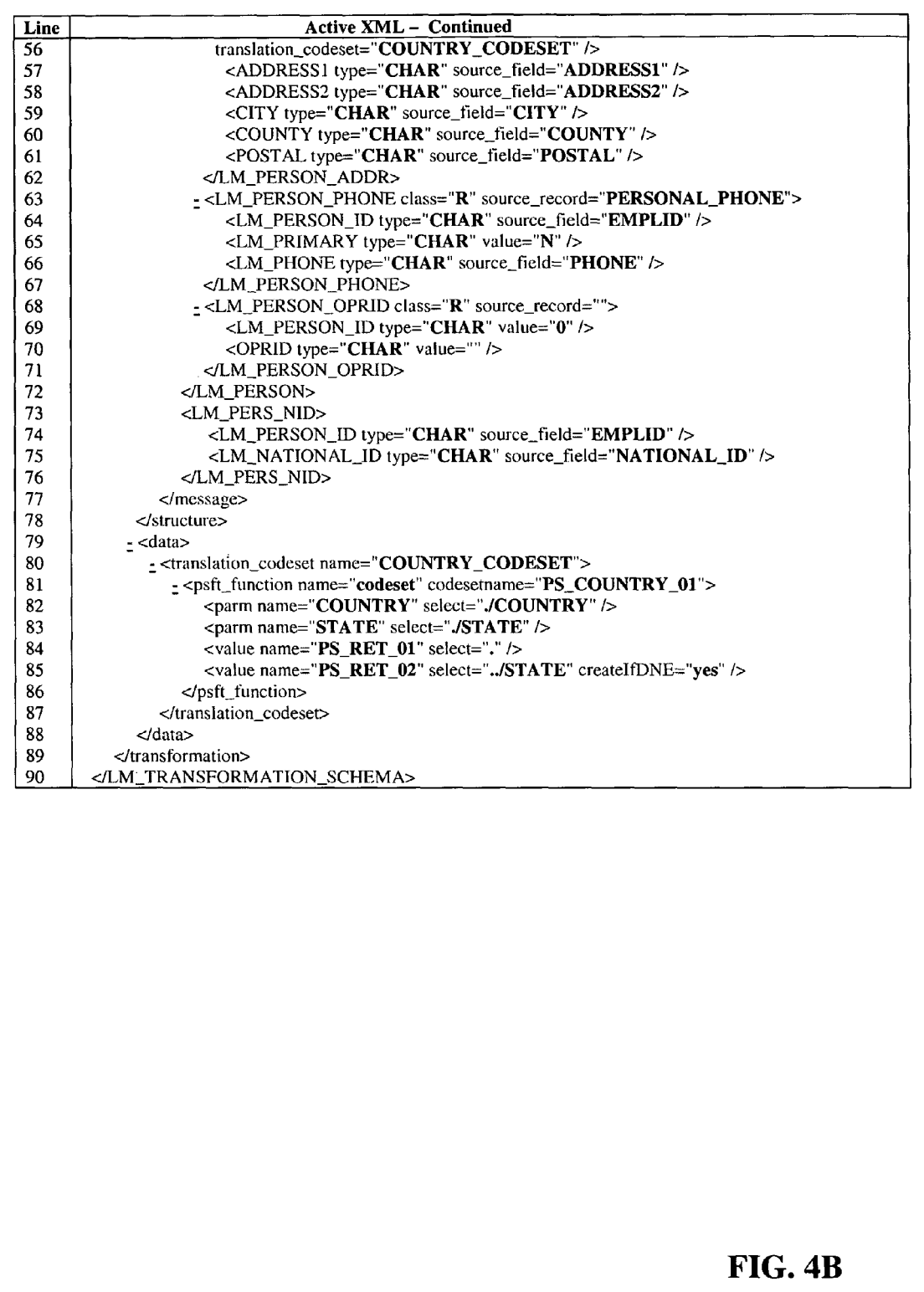

Active XML - Continued

```
          translation_codeset="COUNTRY_CODESET" />
            <ADDRESS1 type="CHAR" source_field="ADDRESS1" />
            <ADDRESS2 type="CHAR" source_field="ADDRESS2" />
            <CITY type="CHAR" source_field="CITY" />
            <COUNTY type="CHAR" source_field="COUNTY" />
            <POSTAL type="CHAR" source_field="POSTAL" />
          </LM_PERSON_ADDR>
        - <LM_PERSON_PHONE class="R" source_record="PERSONAL_PHONE">
            <LM_PERSON_ID type="CHAR" source_field="EMPLID" />
            <LM_PRIMARY type="CHAR" value="N" />
            <LM_PHONE type="CHAR" source_field="PHONE" />
          </LM_PERSON_PHONE>
        - <LM_PERSON_OPRID class="R" source_record="">
            <LM_PERSON_ID type="CHAR" value="0" />
            <OPRID type="CHAR" value="" />
          </LM_PERSON_OPRID>
        </LM_PERSON>
        <LM_PERS_NID>
          <LM_PERSON_ID type="CHAR" source_field="EMPLID" />
          <LM_NATIONAL_ID type="CHAR" source_field="NATIONAL_ID" />
        </LM_PERS_NID>
      </message>
    </structure>
  - <data>
    - <translation_codeset name="COUNTRY_CODESET">
      - <psft_function name="codeset" codesetname="PS_COUNTRY_01">
          <parm name="COUNTRY" select="./COUNTRY" />
          <parm name="STATE" select="./STATE" />
          <value name="PS_RET_01" select="." />
          <value name="PS_RET_02" select="../STATE" createIfDNE="yes" />
        </psft_function>
      </translation_codeset>
    </data>
  </transformation>
</LM_TRANSFORMATION_SCHEMA>
```

FIG. 4B

| Line | Transformed Data Output |
|---|---|
| 1 | - <LM_PERSON_BASIC_FULLSYNC> |
| 2 | - <FieldTypes> |
| 3 | - <LM_PERSON class="**R**"> |
| 4 | <LM_PERSON_ID type="**CHAR**" /> |
| 5 | <LM_PER_STATUS type="**CHAR**" /> |
| 6 | <LM_BIRTHDATE type="**DATE**" /> |
| 7 | <LM_COMM_METHOD type="**CHAR**" /> |
| 8 | <LM_SOURCE_IND type="**CHAR**" /> |
| 9 | <LM_EXT_PERSON_FLG type="**CHAR**" /> |
| 10 | <LM_HR_EMPLID type="**CHAR**" /> |
| 11 | <LM_ROW_ADDED_DTTM type="**DATETIME**" /> |
| 12 | <LM_ROW_ADDED_OPRID type="**CHAR**" /> |
| 13 | <LM_ROW_MAINT_DTTM type="**DATETIME**" /> |
| 14 | <LM_ROW_MAINT_OPRID type="**CHAR**" /> |
| 15 | </LM_PERSON> |
| 16 | - <LM_PERSON_EFFDT class="**R**"> |
| 17 | <LM_PERSON_ID type="**CHAR**" /> |
| 18 | <EFFDT type="**DATE**" /> |
| 19 | <LM_LANG_CD type="**CHAR**" /> |
| 20 | <LM_SEX type="**CHAR**" /> |
| 21 | <LM_ROW_ADDED_DTTM type="**DATETIME**" /> |
| 22 | <LM_ROW_ADDED_OPRID type="**CHAR**" /> |
| 23 | <LM_ROW_MAINT_DTTM type="**DATETIME**" /> |
| 24 | <LM_ROW_MAINT_OPRID type="**CHAR**" /> |
| 25 | </LM_PERSON_EFFDT> |
| 26 | - <LM_PERSON_NAME class="**R**"> |
| 27 | <LM_PERSON_ID type="**CHAR**" /> |
| 28 | <EFFDT type="**DATE**" /> |
| 29 | <LM_NAME_TYPE type="**CHAR**" /> |
| 30 | <COUNTRY_NM_FORMAT type="**CHAR**" /> |
| 31 | <NAME type="**CHAR**" /> |
| 32 | <NAME_INITIALS type="**CHAR**" /> |
| 33 | </LM_PERSON_NAME> |
| 34 | - <LM_PERSON_ADDR class="**R**"> |
| 35 | <LM_PERSON_ID type="**CHAR**" /> |
| 36 | <LM_CM_PURP_TYPE type="**CHAR**" /> |
| 37 | <EFFDT type="**DATE**" /> |
| 38 | <EFF_STATUS type="**CHAR**" /> |
| 39 | <LM_PRIMARY type="**CHAR**" /> |
| 40 | <LM_PHONE type="**CHAR**" /> |
| 41 | <COUNTRY type="**CHAR**" /> |
| 42 | <ADDRESS1 type="**CHAR**" /> |
| 43 | <ADDRESS2 type="**CHAR**" /> |
| 44 | <CITY type="**CHAR**" /> |
| 45 | <COUNTY type="**CHAR**" /> |
| 46 | <POSTAL type="**CHAR**" /> |
| 47 | </LM_PERSON_ADDR> |
| 48 | - <LM_PERSON_PHONE class="**R**"> |
| 49 | <LM_PERSON_ID type="**CHAR**" /> |
| 50 | <LM_CM_PURP_TYPE type="**CHAR**" /> |
| 51 | <LM_PRIMARY type="**CHAR**" /> |
| 52 | <LM_COUNTRY_CODE type="**CHAR**" /> |
| 53 | <LM_PHONE type="**CHAR**" /> |
| 54 | </LM_PERSON_PHONE> |
| 55 | - <LM_PERSON_OPRID class="**R**"> |

FIG. 5A

Transformed Data Output – Continued

```
        <LM_PERSON_ID type="CHAR" />
        <OPRID type="CHAR" />
      </LM_PERSON_OPRID>
      <LM_PERS_NID>
        <LM_PERSON_ID type="CHAR"/>
        <LM_NATIONAL_ID type="CHAR"/>
      </LM_PERS_NID>
    - <PSCAMA class="R">
        <LANGUAGE_CD type="CHAR" />
        <AUDIT_ACTN type="CHAR" />
        <BASE_LANGUAGE_CD type="CHAR" />
        <MSG_SEQ_FLG type="CHAR" />
        <PROCESS_INSTANCE type="NUMBER" />
        <PUBLISH_RULE_ID type="CHAR" />
        <MSGNODENAME type="CHAR" />
      </PSCAMA>
    </FieldTypes>
  - <MsgData>
    - <Transaction>
      - <LM_PERSON class="R">
          <LM_PERSON_ID>B-BARET100</LM_PERSON_ID>
          <LM_PER_STATUS>E</LM_PER_STATUS>
          <LM_BIRTHDATE>1953-10-14</LM_BIRTHDATE>
          <LM_COMM_METHOD>EMAL</LM_COMM_METHOD>
          <LM_SOURCE_IND>HRMS</LM_SOURCE_IND>
          <LM_EXT_PERSON_FLG>N</LM_EXT_PERSON_FLG>
          <LM_HR_EMPLID>B-BARET100</LM_HR_EMPLID>
          <LM_ROW_ADDED_DTTM />
          <LM_ROW_ADDED_OPRID>PPLSOFT</LM_ROW_ADDED_OPRID>
          <LM_ROW_MAINT_DTTM />
          <LM_ROW_MAINT_OPRID>PPLSOFT</LM_ROW_MAINT_OPRID>
        - <LM_PERSON_EFFDT class="R">
            <LM_PERSON_ID>B-BARET100</LM_PERSON_ID>
            <EFFDT>1993-01-25</EFFDT>
            <LM_LANG_CD />
            <LM_SEX>F</LM_SEX>
            <LM_ROW_ADDED_DTTM />
            <LM_ROW_ADDED_OPRID>PPLSOFT</LM_ROW_ADDED_OPRID>
            <LM_ROW_MAINT_DTTM />
            <LM_ROW_MAINT_OPRID>PPLSOFT</LM_ROW_MAINT_OPRID>
          - <LM_PERSON_NAME class="R">
              <LM_PERSON_ID>B-BARET100</LM_PERSON_ID>
              <EFFDT>1993-01-25</EFFDT>
              <LM_NAME_TYPE>PRI</LM_NAME_TYPE>
              <COUNTRY_NM_FORMAT>USA</COUNTRY_NM_FORMAT>
              <NAME>Default,Tocurrent1</NAME>
              <NAME_INITIALS />
            </LM_PERSON_NAME>
          - <PSCAMA class="R">
              <AUDIT_ACTN>A</AUDIT_ACTN>
            </PSCAMA>
          </LM_PERSON_EFFDT>
        - <PSCAMA class="R">
            <AUDIT_ACTN>A</AUDIT_ACTN>
          </PSCAMA>
```

FIG. 5B

| Line | Transformed Data Output - Continued |
|---|---|
| 111 | - <LM_PERSON_ADDR class="**R**"> |
| 112 | <LM_PERSON_ID>**B-BARET100**</LM_PERSON_ID> |
| 113 | <LM_CM_PURP_TYPE>**HOME**</LM_CM_PURP_TYPE> |
| 114 | <EFFDT>**1993-01-25**</EFFDT> |
| 115 | <EFF_STATUS>**A**</EFF_STATUS> |
| 116 | <LM_PRIMARY>**N**</LM_PRIMARY> |
| 117 | <LM_PHONE>**800-380-7638**</LM_PHONE> |
| 118 | <COUNTRY>**USA**</COUNTRY> |
| 119 | <ADDRESS1>**12 Main St.**</ADDRESS1> |
| 120 | <ADDRESS2 /> |
| 121 | <CITY>**Pleasanton**</CITY> |
| 122 | <COUNTY /> |
| 123 | <POSTAL>**94588**</POSTAL> |
| 124 | </LM_PERSON_ADDR> |
| 125 | - <PSCAMA class="**R**"> |
| 126 | <AUDIT_ACTN>**A**</AUDIT_ACTN> |
| 127 | </PSCAMA> |
| 128 | - <LM_PERSON_ADDR class="**R**"> |
| 129 | <LM_PERSON_ID>**B-BARET100**</LM_PERSON_ID> |
| 130 | <LM_CM_PURP_TYPE>**MAIL**</LM_CM_PURP_TYPE> |
| 131 | <EFFDT>**1993-01-25**</EFFDT> |
| 132 | <EFF_STATUS>**A**</EFF_STATUS> |
| 133 | <LM_PRIMARY>**N**</LM_PRIMARY> |
| 134 | <LM_PHONE>**800-380-7638**</LM_PHONE> |
| 135 | <COUNTRY>**USA**</COUNTRY> |
| 136 | <ADDRESS1>**12 Main St.**</ADDRESS1> |
| 137 | <ADDRESS2 /> |
| 138 | <CITY>**Pleasanton**</CITY> |
| 139 | <COUNTY /> |
| 140 | <POSTAL>**994588**</POSTAL> |
| 141 | </LM_PERSON_ADDR> |
| 142 | - <PSCAMA class="**R**"> |
| 143 | <AUDIT_ACTN>**A**</AUDIT_ACTN> |
| 144 | </PSCAMA> |
| 145 | - <LM_PERSON_PHONE class="**R**" source_record="PERSONAL_PHONE"> |
| 146 | <LM_PERSON_ID>**B-BARET100**</LM_PERSON_ID> |
| 147 | <LM_PRIMARY>**N**</LM_PRIMARY> |
| 148 | <LM_PHONE>**800-380-7638**</LM_PHONE> |
| 149 | </LM_PERSON_PHONE> |
| 150 | - <PSCAMA class="**R**"> |
| 151 | <AUDIT_ACTN>**A**</AUDIT_ACTN> |
| 152 | </PSCAMA> |
| 153 | - <LM_PERSON_OPRID class="**R**"> |
| 154 | <LM_PERSON_ID>**0**<LM_PERSON_ID /> |
| 155 | <OPRID /> |
| 156 | </LM_PERSON_OPRID> |
| 157 | - <PSCAMA class="**R**"> |
| 158 | <AUDIT_ACTN>**A**</AUDIT_ACTN> |
| 159 | </PSCAMA> |
| 160 | </LM_PERSON> |
| 161 | - <PSCAMA class="**R**"> |
| 162 | <LANGUAGE_CD>**ENG**</LANGUAGE_CD> |
| 163 | <AUDIT_ACTN>**A**</AUDIT_ACTN> |
| 164 | <BASE_LANGUAGE_CD>**ENG**</BASE_LANGUAGE_CD> |
| 165 | <MSG_SEQ_FLG /> |

FIG. 5C

| Line | Transformed Data Output - Continued |
|---|---|
| 166 | <PROCESS_INSTANCE>**67**</PROCESS_INSTANCE> |
| 167 | <PUBLISH_RULE_ID>**PERSON_BASIC**</PUBLISH_RULE_ID> |
| 168 | <MSGNODENAME /> |
| 169 | </PSCAMA> |
| 170 | <LM_PERS_NID> |
| 171 | <LM_PERSON_ID>**B-BARET100**</LM_PERSON_ID> |
| 172 | <LM_NATIONAL_ID>**000999000**</LM_NATIONAL_ID> |
| 173 | </LM_PERS_NID> |
| 174 | <PSCAMA class="**R**"> |
| 175 | <AUDIT_ACTN>**A**</AUDIT_ACTN> |
| 176 | </PSCAMA> |
| 177 | </Transaction> |
| 178 | </MsgData> |
| 179 | </LM_PERSON_BASIC_FULLSYNC> |

FIG. 5D

APPLICATION INTERFACE INCLUDING DYNAMIC TRANSFORM DEFINITIONS

BACKGROUND

1. Field of the Invention

The invention is in the field of computer software and more specifically in the field of application interfaces.

2. Description of the Prior Art

Computing systems are benefited by their ability to exchange data between applications. In some cases, this ability is extended to allow one application to call functions within another application. For example, it is common for a word processing program to transfer data and execute functions of a printer driver. These functions are accessed using application programming interfaces (APIs) defined for the word processing program and the printer driver.

When disparate applications must communicate with each other it is not unusual to transform data as part of the communication. This transform converts data from a format generated by one application to a format understood by the other application. In some cases scripts are used to generate transformation code that is then executed to perform a transformation. Once transformation code is generated using a script, the script is no longer an active part of the transformation process. These scripts are usually written with a specific transformation in mind and must be rewritten for each new transformation. This process can require significant effort and often includes rewriting common sections of script.

An API can be somewhat more flexible when metadata is received as input. In these cases, transformation code can determine the type of data received and perform appropriate transforms and error checking. However, even when taking advantage of metadata, current transform methods suffer significant disadvantages. For example, transforms introduce a new potential source of error that can be difficult to debug. Prior art transforms tend to be single thread processes that start at the beginning of data to be transformed and continue to the end of the data in a serial manner. They are, therefore not configurable to take advantage of dynamic multi-thread computing. Further, this serial approach makes nesting and un-nesting operations difficult. Known transforms are performed using static code configured to simply map one data field to another. Even when the transform code is generated using a script, the transformation code is static at the time of execution and therefore not configurable for dynamic optimization of the transform process.

There is a need for new application program interfaces and data transforms that overcome these and other disadvantages of the prior art.

SUMMARY OF THE INVENTION

The invention includes systems and methods of transforming data communicated through an application programming interface. This data may include both commands configured to direct an application and parameters on which the application is configured to act. The transformation uses a transform schema (transform process definition) that dynamically directs the transform process as it is occurring, in addition to mapping input data fields to output data fields. Typically, the transform process definition is in the form of meta-language configured to be interpreted during the defined transformation. Through the systems and methods described herein, the versatility and ease-of-use associated with meta-languages may be imparted to application programming interfaces thus increasing the range of formats and data structures with which communication can occur.

The process of transforming data between various data formats and structures includes using the transform process definition and a transformation engine to interpret incoming data to be transformed, and to generate corresponding output data. In various embodiments, the data to be transformed is received in a metadata format. The metadata structure of the data to be transformed is configured for the transformation engine to identify data elements within the data to be transformed and to apply the transform process definition responsive to this identification. The transform process definition is selected from a transform schema using identification information found in the data to be transformed. The transform schema typically includes a set of one or more transform process definitions.

In various embodiments, the transform schema is also embodied in a metadata format, such as an extensible markup language (XML). In various embodiments, the transform schema is configured in a hierarchical data structure representative of levels of nested data records that will be reflected in output data. Typically, the hierarchical data structure is configured to be navigated as a tree data structure. As described further herein, these configurations are optionally used to direct recursive processes during a transformation. Thus, in addition to defining mapping of input data fields to output data fields, the transform process definition selected from the transform schema is a process definition, used by the transformation engine to direct a transformation process.

In various embodiments, the transformation process occurs in two steps. The first step includes identification of an appropriate transform process definition and addition of this transform process definition to the input data. The result of this step is a single data set including both the input data and part of the transform schema configured to direct the conversion of the data to be transformed to a desired output. In the second step, this single data set is processed by a transformation engine to generate the desired output.

Various embodiments of the invention include a data transformation system comprising a data interface configured to receive data to be transformed or to send transformed data, memory configured to store one or more transform process definitions having at least one simple transform definition and at least one compound transform definition, an application including computer instructions, and a data interpreter configured to exchange data with the data interface and the application, the data interpreter including a transform engine configured to select a transform process definition from the one or more transform process definitions, the selected transform process definition including a hierarchical data structure, concurrently navigate the selected transform process definition and the data to be transformed, navigation within the data to be transformed being responsive to transform definitions within the selected transform process definition, and generate output data having a data structure responsive to a data structure of the selected transform process definition.

Various embodiments of the invention include a data interpreter configured to transform data to be transformed, the data interpreter comprising at least one computing device, and a transform engine supported by the computing device, the transform engine being configured to access a transform process definition including a hierarchical data structure of transform definitions, the data structure including a simple transform definition and a compound transform definition, concurrently navigate the transform process definition and the data to be transformed, navigation within the data to be transformed being responsive to the transform definition within the transform process definition, and generate output data having a data structure responsive to the transform process definition.

Various embodiments of the invention include a method of transforming data using an application programming interface, the method comprising receiving data to be transformed at the application programming interface, parsing identification data within the data to be transformed, the identification data characterizing the data to be transformed using the identification data to select a transform process definition from a transform schema, the selected transform process definition defining a process of translating data elements within the data to be transformed to output data elements, and transforming the data to be transformed to output data, using a transformation engine and the selected transform process definition, a data structure of the output data being responsive to a data structure of the transform process definition.

Various embodiments of the invention include a method of transforming data using an application programming interface, the method comprising receiving data to be transformed at the application programming interface, the data to be transformed including identification data using the identification data to select a transform process definition from a set of transform process definitions, the selected transform process definition defining a process of translating data elements within data to be transformed to output data elements, and transforming the data to be transformed to output data by concurrently navigating the data to be transformed and the selected transform process definition, navigation in the data to be transformed being responsive to the transform process definition.

Various embodiments of the invention include a method of transforming data, the method comprising positioning a definition pointer to point at one of a plurality of transform definitions within a transform process definition reading the pointed at transform definition, searching data to be transformed for a data element to be transformed, the search being responsive to the pointed at transform definition, and transforming any found data element into output data, responsive to the pointed at transform definition, a data structure of the output data being responsive to a data structure of the transform process definition.

Various embodiments of the invention include a method of transforming data, the method comprising positioning a definition pointer to point at a transform definition, the transform definition being one of a plurality of transform definitions within a transform process definition, reading the pointed at transform definition, positioning a payload pointer to point at a data element to be transformed, the positioning being responsive to a data structure of the transform process definition, and transforming the data element into output data, responsive to the read transform definition.

Various embodiments of the invention include a method of preparing data for transformation, the method comprising receiving data to be transformed, parsing the received data to determine identification information, using the identification information to extract a transform process definition from a transform schema, the extracted transform process definition including a transform definition configured to transform the data to be transformed, to direct navigation within the data to be transformed during transformation, and to determine a data structure of output data resulting from transformation of the data to be transformed, the transform definition including a hierarchical data structure having at least one simple transform definition and at least one compound transform definition, the compound transform definition being configured to generate a compound data element in the output data, and adding the extracted transform process definition to meta-language transform input data including the data to be transformed.

Various embodiments of the invention include a computer readable media having embodied thereon data, the data comprising computer instructions configured to position a definition pointer to point at a transform definition, the transform definition being one of a plurality of transform definitions within a transform process definition, computer instructions configured to read the pointed at transform definition, computer instructions configured to increment a payload pointer, within the data to be transformed, to a data element to be transformed, the incrementation being responsive to the pointed at transform definition, and computer instructions configured to transform any found data element into output data, responsive to the pointed at transform definition, a data structure of the output data being responsive to a data structure of the transform process definition.

Various embodiments of the invention include a computer readable media having embodied thereon data, the data comprising payload data including data to be transformed, the data to be transformed including metadata characterizing simple data elements and compound data elements, and a transform process definition including a transform definition configured to transform the data to be transformed, to direct navigation within the data to be transformed during transformation, and to determine a data structure of output data resulting from the transformation, the transform definition including a hierarchical data structure having at least one simple transform definition and at least one compound transform definition, the compound transform definition being configured to generate a compound data element in the output data.

Various embodiments of the invention include an application system comprising means for positioning a definition pointer to point at a transform definition within a transform process definition, means for reading the transform definition, means for positioning a payload pointer to point to a first data element, the first data element being a member of a plurality of data elements within data to be transformed, and means for generating output data using the first data element and the transform definition.

BRIEF DESCRIPTIONS OF THE VARIOUS VIEWS OF THE DRAWING

FIGS. 3A-3F illustrate data to be transformed, according to various embodiments of the intention;

FIGS. 4A-4B illustrate a transform process definition, according to various embodiments of the invention;

FIGS. 5A-5D illustrate data transformed using the transform process definition of FIGS. 4A-4B;

DETAILED DESCRIPTION

The invention includes a data interpreter configured to interpret data stored in a variety of data structures. The data interpreter may be integrated into an application or alternatively be part of an application programming interface used by one or more associated applications. The data interpreter includes a transformation engine configured to transform data from one data structure to another under the control of a transform process definition. In some instances this transformation includes transforming received data into a format that can be directly read by a first application and in some instance this transformation includes transforming output data of the first application to a format intended for a second application.

The transformation process performed by the transformation engine is defined and controlled by a structured transform process definition. In typical embodiments, this transform process definition includes a hierarchical set of nested records defining specific transforms for specific data types. The transform process definition also includes information configured to control navigation within the data to be transformed, to select data elements to be transformed, to determine a structure of the output data, or the like. The transform process definition is optionally reentrant and can thus have multiple simultaneous, interleaved, or nested invocations that do not interfere with each other. As further described herein, the reentrant property is useful to embodiments of the invention that include parallel processing and/or recursive functions. In some embodiments, the transform process definition is defined in extensible markup language (XML).

During the transformation process the structured data to be transformed and the structured transform process definition are traversed concurrently. The transform process definition is traversed linearly from beginning to end while parts of data to be transformed are traversed as directed by the transform process definition to perform the transformation. In various embodiments, traversal of the transform process definition results in initiation of parallel processes that are configured to transform specific parts of the data to be transformed. As described further herein, these parallel processes are optionally defined by the data structure of the transform process definition.

Figure 1:
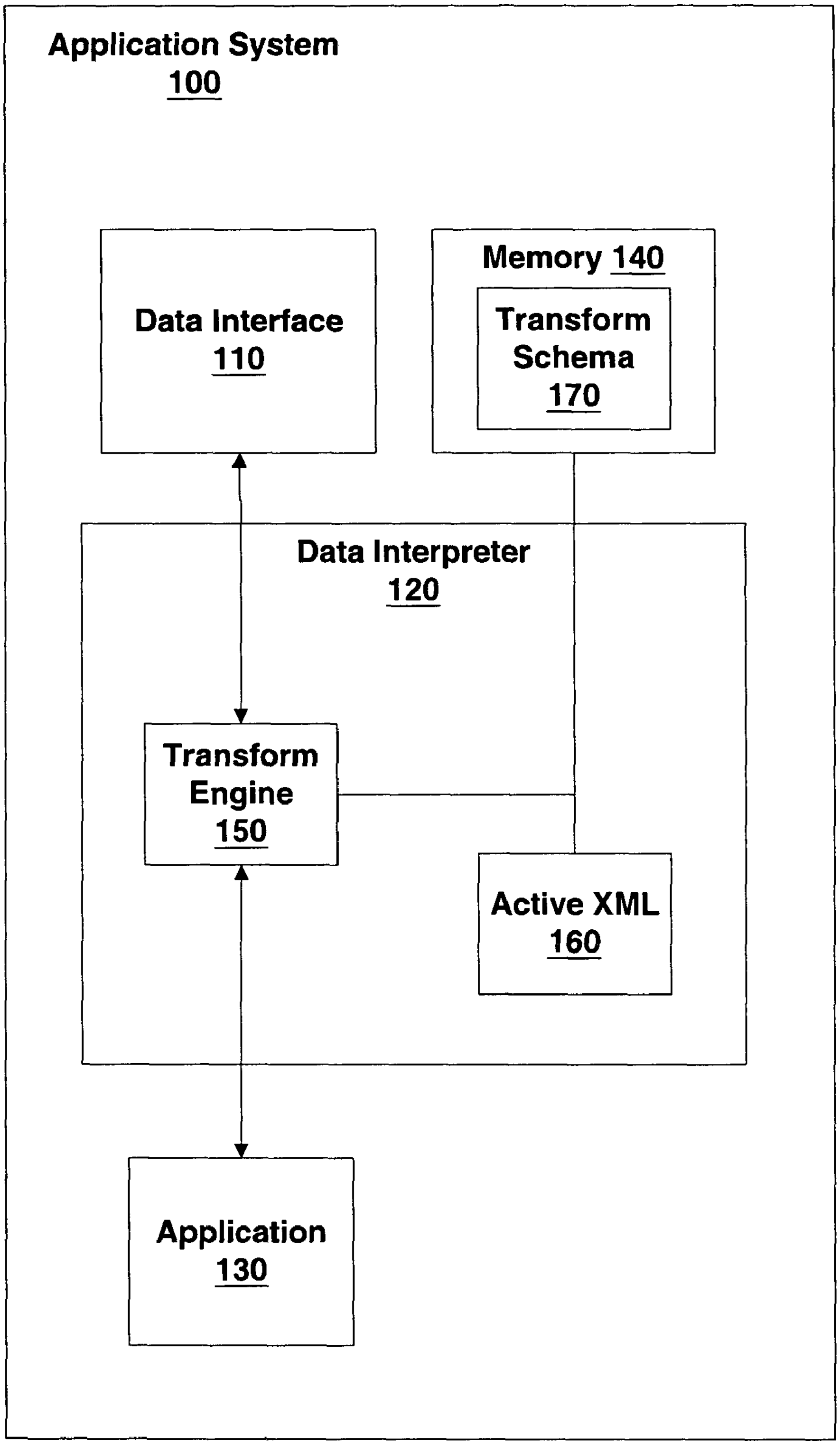
FIG. 1 is block diagram of an application system, according to various embodiments of the invention.

FIG. 1 is block diagram of an Application System 100, according to various embodiments of the invention. Application System 100 is a computing device or network of computing devices including a Data Interface 110, a Data Interpreter 120, an Application 130, and Memory 140. Data Interface 110 includes computer instructions and/or hardware configured for communication of data to or from Data Interpreter 120. In some embodiments, Data Interface 110 is a network interface configured to communicate through a computer network such as the Internet or a local area network. In some embodiments, Data Interface 110 is configured to communicate with data entry devices such as a keyboard or storage device.

Data Interpreter 120 includes computer instructions configured to exchange data through Data Interface 110 and to exchange data with one or more Application 130 included in Application System 100. In some embodiments, Data Interpreter 120 is integrated into Application 130. In some embodiments, one Data Interpreter 120 is configured to operate as an application programming interface to more than one Application 130. Data Interpreter 120 further includes a Transform Engine 150 configured to identify and use an Active XML 160 to transform data. Active XML 160 is a transform process definition selected from Transform Schema 170 stored in Memory 140. Data Interpreter 120 includes one or more computing devices configured to support Transform Engine 150 and optionally to support Application 130.

Application 130 is typically a set of computer instructions configured to execute on Application System 100. For example, in various embodiments Application 130 is a database application, accounting application, human resources application, customer management application, inventory application, internet application, or the like. In some embodiments, Application 130 executes on a computing device other than those computing device(s) configured to support Data Interpreter 120 or including Memory 140. Application 130 is optionally configured to receive transformed data from Data Interpreter 120 and/or to provide data to be transformed by Data Interpreter 120.

Figure 2:
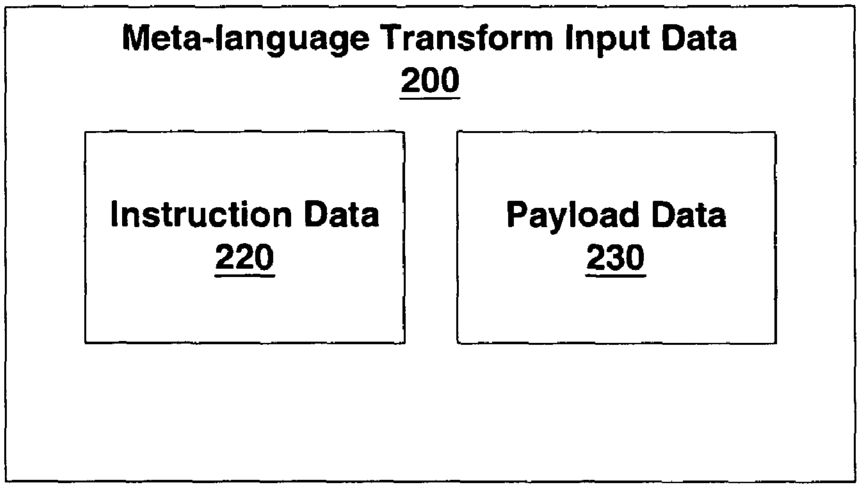
FIG. 2 is a block diagram of meta-language transform input data, according to various embodiments of the invention.

FIG. 2 is a block diagram of Meta-language Transform Input Data 200, as may be received by Data Interpreter 120, according to various embodiments of the invention. Meta-language Transform Input Data 200 includes Instruction Data 220 and Payload Data 230. Instruction Data 220 optionally includes data identifying the source of Meta-language Transform Input Data 200, a format of Meta-language Transform Input Data 200, a destination of Meta-language Transform Input Data 200, a format to which Meta-language Transform Input Data 200 is to be transformed, and/or the like. Instruction Data 220 is optional if this type of information can be obtained through other methods, such as an IP address of a source of Meta-language Transform Input Data 200.

Payload Data 230 includes data to be transformed using Data Interpreter 120. Typically, the format of Payload Data 230 is characterized by Instruction Data 220 or by metadata within Payload Data 230. Payload Data 230 optionally includes structured data types such as nested data records and/or a tree structure.

As discussed further herein, in some embodiments, Active XML 160 is added to any Instruction Data 220 prior to transformation using Transform Engine 150. In these embodiments Transform Engine 150 is optionally divided into two components. A first component configured to select Active XML 160 from within Transform Schema 170 and add the selected Active XML 160 to Instruction Data 220, and a second component configured to transform the resulting Meta-language Transform Input Data 200. These two components are optionally executed on different computing devices. In some embodiments, the second component is integrated with Application 130 while the first component is not.

FIGS. 3A-3F, 4A-4B and 5A-5D illustrate data involved in the transformation process according to various embodiments of the invention. FIGS. 3A-3F illustrate an example of Meta-language Transform Input Data 200 to be transformed, FIGS. 4A-4B illustrate an example of Active XML 160 extracted from Transform Schema 170, and FIGS. 5A-5D illustrate transformed data generated by applying the transform of FIGS. 4A-4B to the input data of FIGS. 3A-3F. In each of FIGS. 3A-3F, 4A-4B and 5A-5D line numbers have been added to designate specific lines.

The data illustrated in FIGS. 3A-3F include nested metadata records configured to store data characterizing a person. Data of this nature may be included in Meta-language Transform Input Data 200. FIG. 3A line 1 through FIG. 3C line 143 are a representative example of Instruction Data 220. FIG. 3A line 1 identifies the start and content of Meta-language Transform Input Data 200. FIG. 3A line 2 through FIG. 3C line 143 define the data field types found in Payload Data 230. FIG. 3C line 144 through FIG. 3F line 323 comprise a representative example of Payload Data 230.

The embodiment of Payload Data 230 shown in FIGS. 3A-3F includes at least two types of data elements, compound elements and simple elements. For example, FIG. 3C line 149 includes a simple element with name BIRTHDATE and including a value "1953-10-14." FIG. 3A line 6 includes information indicating that the simple element BIRTHDATE is configured to hold data of type DATE, thus indicating a type for the value "1953-10-14." In another example, FIG. 3E lines 239 through 262 include a compound element ADDRESSES of class=R (for record). This element is a record including sub-elements EMPLID, ADDRESS_TYPE, CITY, etcetera. In some embodiments, data to be transformed includes several layers of elements and nested sub-elements. Each element is defined by a start tag and an end tag. For example, line 239 includes a start tag <ADDRESSES class=R"> and a corresponding end tag </ADDRESSES> is found at line 262. Transform Engine 150 is configured to determine the start and end of a data element using these tags. An end tag, without a start tag, is optionally used to indicate when no value is present in a field. See, for example, FIG. 3E line 250. Payload Data 230 includes records configured to control auditing functions. See for example, FIG. 3F lines 290 through 292. The PSCAMA record includes a AUDIT_ACTN element that is optionally set to indicate if the prior record has been added, changed or deleted.

The data illustrated in FIGS. 4A and 4B is an illustrative example of Active XML 160. Active XML 160 optionally includes both simple transform definitions and compound transform definitions configured to result in simple data elements and compound data elements in the transformed data output, respectively. Typically, compound transform definitions include sub-definitions configured to define sub-elements in the transformed data output.

The bulk of the data included in Active XML 160 has been identified and selected from Transform Schema 170 for use in a particular transformation (i.e., transformation of the data shown in FIGS. 3A-3F. FIG. 4A line 1 through line 11 include identification and version data). This line identifies the start of a compound data element in which the transform process definition is embodied. Further data, retrieved from Transform Schema 170, based on identifying data found in the Meta-language Transform Input Data 200, starts at FIG. 4A line 12. This line identifies other characteristics of the transformation, such as that it is configured for "IA" (inbound asynchronous) data. Transform Schema 170 typically includes data defining more than one type of transformation that may be selected for inclusion in Active XML 160 based on the data type, data source, direction of data transmission, or the like. However, in a typical embodiment, only the transform process definition necessary to perform a particular transformation is selected from Transform Schema 170 for inclusion in Active XML 160. Active XML 160 may be stored temporarily as needed to perform a transformation.

The Active XML 160 illustrated in FIGS. 4A-4B includes definitions for transformation of both data structures and data values. These transformations are defined from FIG. 4A line 13 through FIG. 4B line 88. Structural transformations optionally include reordering or records, filtering of records, elimination of records, addition of records, nesting and unnesting of data structures, or like operations. Data value transformations optionally include removal of values substitution of values, or addition of values.

Active XML 160 illustrated in FIG. 4B further includes dynamic functions configured to be interpreted during the transformation process. A dynamic function is illustrated in FIG. 4B lines 80-87. Dynamic functions are optionally configured to perform logic operations, external process calls, or other operations associated with a computer function and to transform payload Data 230 in response.

FIGS. 5A-5D illustrate data transformed using Transform Engine 150. As described further herein, this transformed data is generated by applying the Active XML 160 of FIGS. 4A-4B to the Meta-language Transform Input Data 200 of FIGS. 3A-3F. Transform Engine 150 concurrently traverses the data structure of Meta-language Transform Input Data 200 and Active XML 160 to perform the transformation. In some embodiments, Meta-language Transform Input Data 200 and Active XML 160 are stored in separate locations during this process. In other embodiments, Active XML 160 is added to Instruction Data 220 of Meta-language Transform Input Data 200 prior to the transformation process. In these embodiments, Transform Engine 150 employs a plurality of pointers to concurrently traversed more than one part of Meta-language Transform Input Data 200.

Figure 6:
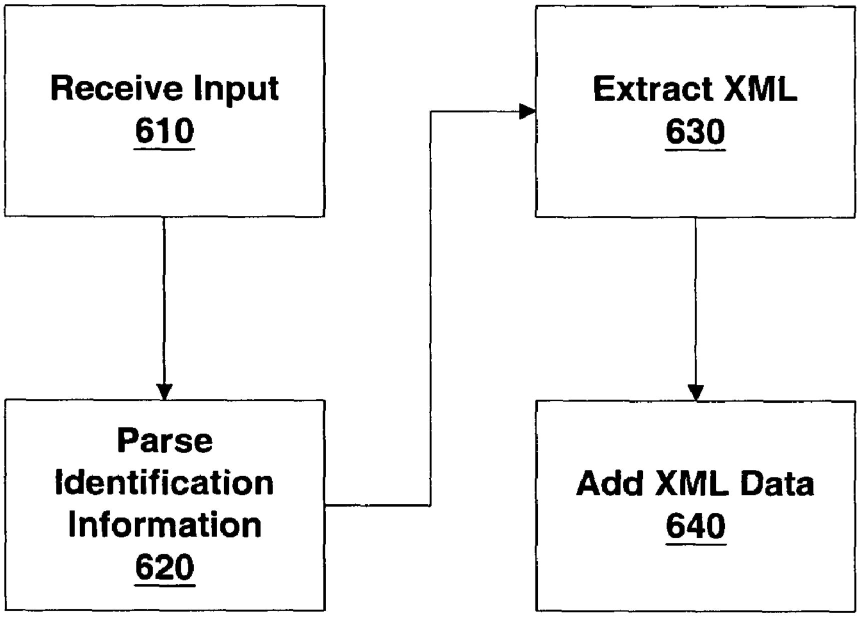
FIG. 6 illustrates a method of preparing data for transformation, according to various embodiments of the invention.

FIG. 6 illustrates a method of preparing message data for transformation, according to various embodiments of the invention. In this method, identifying information within Meta-language Transform Input Data 200 is used to identify parts of Transform Schema 170 needed for transformation of Meta-language Transform Input Data 200 to a desired format. These parts are added to Meta-language Transform Input Data 200 as Active XML 160, resulting in a single set of data including both Payload 230 to be transformed and the data (Active XML 160) needed to define the transformation process. This single set of data is optionally transferred over a computer network prior to execution of the transformation.

In a Receive Input Step 610, Transform Engine 150 receives Meta-language Transform Input Data 200 from Application 130 or through Data Interface 110. Typically, data received from Application 130 is to be transformed to a format desired by an application external to Application System 110. Likewise, data received through Data Interface 110 is typically to be transformed to a format compatible with input to Application 130.

In a Parse Identification Information Step 620, Meta-language Transform Input Data 200 is examined for identification data, such as the data included in Instruction Data 220. This information may include, for example, the message name "PERSON_BASIC_FULLSYNC" at FIG. 3A line 1 and FIG. 3F line 324, the source information, the destination information, or the like. In some embodiments of Parse Identification Information Step 620, field types (FIG. 3A line 2 through FIG. 3C line 143) are also noted.

In Extract XML Step 630, identification data, and optionally field type data, found in Parse Identification Information Step 620, are used to extract transform process definitions from Transform Schema 170. The extracted transform process definitions are included in Active XML 160. For example, in various embodiments, a transmission type of IA will result in extraction of transform definitions for a transformation type of IA. Field types information is optionally used to select the transform definitions at greater granularity (e.g. extracting only those transform definitions corresponding to the field types noted in Parse Identification Information Step 620).

In an Add XML Data Step 640 the transform definitions extracted from Transform Schema 170 are added to Meta-language Transform Input Data 200. In some embodiments, the transform definitions are added to Instruction Data 220. The resulting data set includes both the original Meta-language Transform Input Data 200 to be transformed and a process definition (the added Active XML 160 transform definition) configured to perform the transformation. In some embodiments, the resulting data set is transferred to another computing device before transformation. For example, in some embodiments the Meta-language Transform Input Data 200 to be transformed is received from Application 130, Active XML 160 is added using the method illustrated by FIG. 6, and the resulting data is sent to an application external to Application System 100. The receiving application may interpret the received data using the included Active XML 160 process definition. In some embodiments, the resulting data set is transformed prior to being sent to an application external to Application System 100. In some embodiments, the resulting data set is stored on computer readable media such as memory included in Data Interface 110 or a hard drive. Further details of transformation processes are described with respect to FIG. 7.

Figure 7:
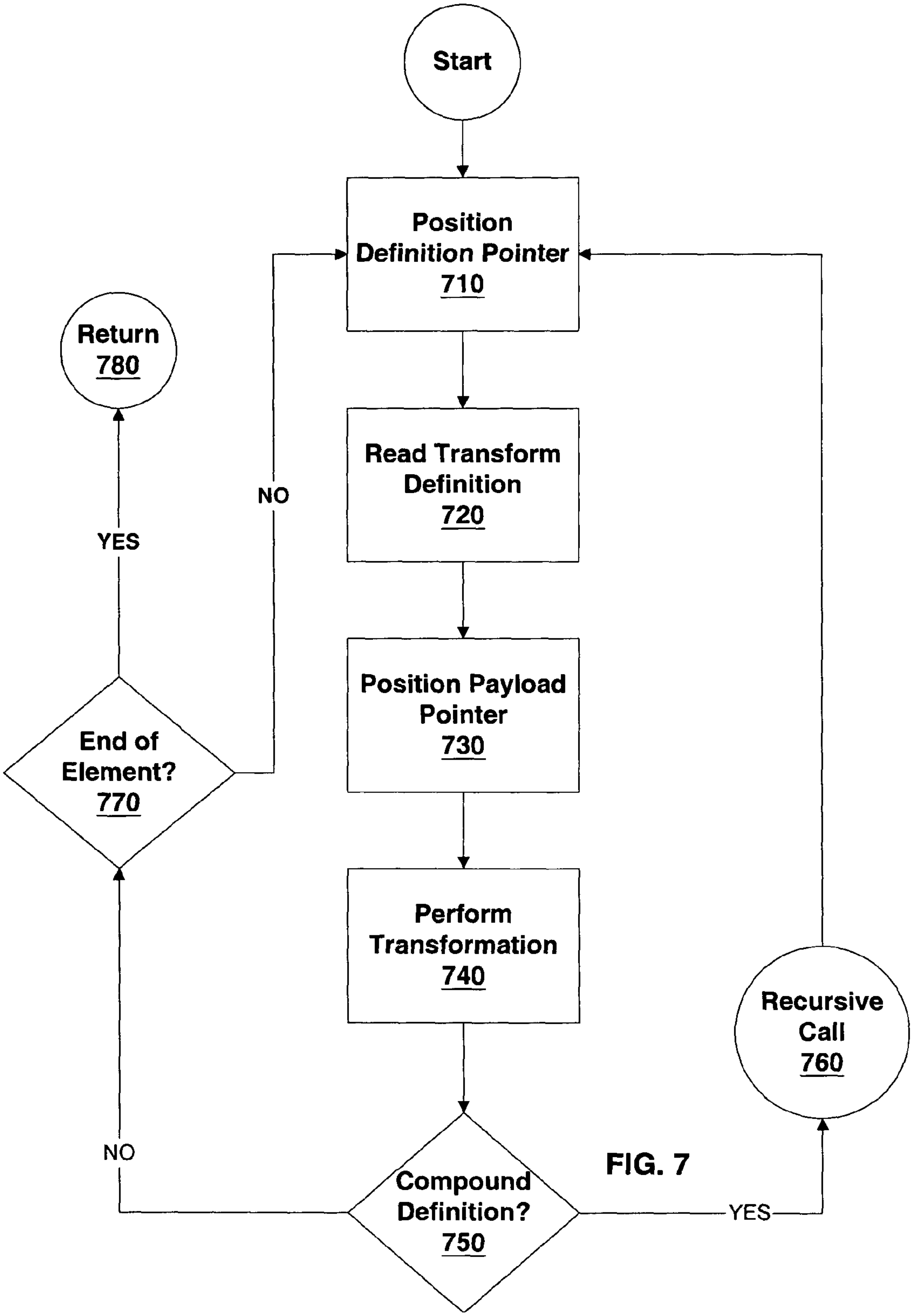
FIG. 7 illustrates a method of data transformation, according to various embodiments of the invention.

FIG. 7 illustrates a method of data transformation, according to various embodiments of the invention. In this method two pointers are used to concurrently navigate Payload Data 230 and Active XML 160. A payload pointer is used to point to the data currently being transformed and a definition pointer is used to point to the appropriate process definition in Active XML 160. When a simple transform definition is defined in Active XML 160, Transform Engine 150 is configured to apply an appropriate transform or corresponding data in Payload Data 230. When a compound transform definition, e.g., a transform definition having sub-elements (daughter elements), is defined, a recursive call is optionally made to the method illustrated in FIG. 7. Thus, the method may be invoked to process all of Active XML 160, recursively invoked again to process a compound transform definition within Active XML 160, or recursively invoked to process a daughter transform definition within a compound transform definition. In some embodiments, recursive invocations are performed using parallel process threads. In alternative embodiments, both simple and compound data elements are processed without using a recursive call to the method illustrated in FIG. 7.

In a Position Definition Pointer Step 710 the definition pointer is positioned to point at the next data element within Active XML 160 to be executed. Position Definition Pointer Step 710 is optionally responsive to how the process of FIG. 7 is initiated. For example, in some embodiments, when the process of FIG. 7 is invoked at the start of a transformation process, Position Definition Pointer Step 710 includes positioning the definition pointer to point at the first transform definition within Active XML 160 (FIG. 4A lines 14-15). When the process of FIG. 7 as invoked through a Recursive Call Step 760, discussed further herein, Position Definition Pointer Step 710 typically includes positioning the definition pointer to the first transform definition within a compound transform definition. For example, the definition pointer may be moved from the compound transform definition at FIG. 4A line 28 to the first sub-element of that compound transform definition at FIG. 4A line 29. When the process of FIG. 7 is invoked immediately following initiation of a parallel processing thread, Position Definition Pointer Step 710 optionally includes positioning the definition pointer to point at the next transform definition at the same level of the data structure as the current transform definition in Active XML 160. For example, the definition pointer may be moved from the compound transform definition at FIG. 4A line 28 to the compound definition at FIG. 4A line 47, skipping the sub-definitions of the compound transform definition at FIG. 4A line 28. In these embodiments, the parallel processing thread is typically configured to transform the skipped sub-definitions.

In a Read Transform Definition Step 720, the transform definition to which the definition pointer is pointed is read. For example, if the definition pointer is pointed to the transform definition at FIG. 4A line 16, then "<LM_PERSON class="R" source_record="PERSON">" is read. This transform definition characterizes an output field having a field name of LM_PERSON. The value of "R" for "class" indicates that this transform definition is a compound transform definition and not a simple transform definition. The "source_record" parameter indicates that data to be transformed should be retrieved from a compound element "PERSON" in Payload 230. In various embodiments, the transform definition read in Read Transform definition step 720 may include other parameters such as "value," "type," "source_field" and "translation_codeset." Examples of these parameters are found on FIG. 4B lines 66, 65, and 56. The value parameter is used to specify a value for an output data element in the transformed data output. Typically, when a value parameter is included, Payload 230 is not examined for a value to place in the output data element. However, in some embodiments, the value specified using the value parameter is a default value that may be replaced if an alternative value is found in Payload 230. The type parameter is used to define a type of the data included in the output data element. The source_field parameter is used to indicate a data element in Payload 230 wherein a value for the corresponding output data element should be found. The translation_codeset parameter is used to identify a set of computer instructions configured for performing logical operations on data within Payload 230. An example of these computer instructions is shown on FIG. 4B lines 80 through 87.

In a Position Payload Pointer Step 730 the payload pointer is positioned within Payload 230. This step is only necessary if the transform definition read in Read Transform definition Step 720 included a source_field, source_record, or other parameter indicating that data is needed from Payload 230 in order to generate the transformed data output. The payload pointer is incremented from a prior position until a data element corresponding to the source_field parameter or source_record parameter is found. The incrementation (search) continues until the corresponding data element has been found, or all data elements at the same level as the current data element have been searched. (E.g, from the last data element in a compound record the payload pointer will be incremented to the first data element and then continue until it returns to its starting position unless the desired record is found.) For example, if the payload pointer is pointed to FIG. 3C line 158, then the current data element is EMPLID and a search for a source_field named MAR_STATUS would result in incrementing the payload pointer to FIG. 3C lines 159, 160 and then 161.

The prior position of the payload pointer is optionally dependent on how the process of FIG. 7 is initiated. For example, when the process of FIG. 7 is invoked at the start of a transformation process, the payload pointer typically starts by pointing at a root node of Payload Data 230 (i.e., FIG. 3C line 145). When the process of FIG. 7 as invoked through a Recursive Call Step 760 or immediately following initiation of a parallel processing thread, the prior position of the payload pointer is determined by the previous execution of Position Payload Pointer Step 730.

In some embodiments the position of the payload pointer following Position Payload Pointer Step 730 is dependent on the current data element and the position of the payload pointer prior to this step. For example, if Transform Engine 150 seeks a source field EFFDT in Payload 230, the payload pointer may be set to point to FIG. 3C line 159, FIG. 3D line 214, FIG. 3E line 242, or FIG. 3E line 269, responsive to the location of the current data element.

In a Perform Transformation Step 740 Transform Engine 150 uses the transform definition in Active XML 160 to which the definition pointer is pointed to transform the data element to which the payload pointer is pointed. Perform Transformation Step 740 is only required if the transform definition read in Read Transform definition Step 720 included a source_field, source_record parameter or other parameter requiring data from Payload 230. If the payload pointer is pointed to FIG. 3C line 147 (EMPLID) and the definition pointer is pointed to FIG. 4A line 17 then the data value ("B-BA-RET100") found in the data to be transformed is transferred to the LM_PERSON_ID field of type char in the transformed data output. The result is illustrated in the transformed data output at FIG. 5B line 76.

Transformations can be applied to either simple elements or compound elements. For example, if the payload pointer is pointed to the PERSON element of FIG. 3C line 146 (a compound element) and the definition pointer is pointed to the <LM_PERSON class "R" source_record="PERSON"> transform definition (FIG. 4A line 16), then the source record "PERSON" is transformed to a new record having a name LM_PERSON. This new record includes data fields configured to hold the data defined by Active XML 160 between FIG. 4A line 16 and FIG. 4B line 72.

Where a "value" is specified for a particular data field, that value is stored in the new field or record. For example, the data field "LM_COMM_METHOD" (a simple data element) has a data type of "CHAR" and is populated with a value "EMAL" (FIG. 4A line 20). This value is placed in the transformed data output (see FIG. 5B line 79). In some embodiments, data found in the transformed data does not have corresponding data elements in the data to be transformed. For example, at FIG. 4A line 22 Active XML 160 defines a field LM_EXT_PERSON_FLG of type CHAR with a value of "N". A resulting field is found at FIG. 5B line 81 of the transformed data output. There is no corresponding data element in the data to be transformed as shown in FIG. 3A-3F. As discussed further herein, fixed values are populated into data fields as each transform definition is process by Transform Engine 150. New fields defined by Active XML 160 do not necessarily need to contain default values. See, for example, the Active XML 160 at FIG. 4A line 26 and resulting transformed data output at FIG. 5B line 85.

Where a "source_field" is specified for a transform definition in Active XML 160, a value is expected to be found in the data to be transformed, such as that illustrated in FIGS. 3A-3F. For example, FIG. 4A line 18 indicates PER_STATUS as a source field for a LM_PER_STATUS data field in the transformed data output. At FIG. 3C line 148 the PER_STATUS field includes a value of "E". During Perform Transformation Step 740 this value is inserted into a new field LM_PER_STATUS (see FIG. 5B line 77).

Where there is no corresponding transform definition within the current element the data element found in the data to be transformed has no contribution to the transformed data output. For example, FIG. 3C. line 161 includes an MAR_STATUS field as part of a PERS_DATA_EFFDT record. However, the Active XML 160 of FIG. 4A-4B does not use this field as part of a corresponding transform record LM_PERSON_EFFDT (see FIG. 4A line 28 through FIG. 4B line 46). In typical embodiments, only instances of the MAR_STATUS field associated with the current data element are considered in Active XML 160. Thus, instances of any MAR_STATUS transform definition outside of the LM_PERSON_EFFDT transform record are not used to define transformation of the MAR_STATUS found within the LM_PERSON_EFFDT compound element (FIG. 3C line 161).

In a Compound Definition Step 750 the type of the transform definition read in Read Transform definition Step 720 is determined. If this transform definition is a compound definition then the method proceeds to a Recursive Call Step 760. If this transform definition is a simple definition then the method proceeds to an End of Element Step 770.

In Recursive Call Step 760, a recursive call is made to the process illustrated by FIG. 7 in order to process sub-definitions within the compound transform definition. Typically, this call includes defining a new payload pointer and a new definition pointer associated with the new process. The initial positions of these pointers are set to the positions of the previously existing payload and definition pointers associated with the parent process that executes Recursive Call Step 760. In alternative embodiments, Recursive Call Step 760 is replaced by a series of steps performing similar operations, but without the use of recursion.

In End of Element Step 770, Transform Engine 150 determines if all sister transform definitions at the level of the current transform definition (the transform definition at which the definition pointer is pointing) have been processed. If so, then the process proceeds to a Return Step 780 wherein execution is returned to the function that called the current process of FIG. 7. For example, if the current process was invoked by a Recursive Call Step 760, performed in a parent process, then execution returns to this parent process in Return Step 780. If the current process was a parallel process spawned by a parent process the spawned process is optionally terminated in Return Step 780. A set of sister transform definitions can be found from FIG. 4A lines 29 through line 37. In some instances a source record is found more than once in Payload Data 230. For example, ADDRESSES records are found at both FIG. 3E lines 239 and 266. Processing of the compound transform definition of FIG. 4A line 47 is not complete until both instance of these ADDRESSES records have been transformed.

If, in End of Element Step 770, Transform Engine 150 determines that all sister transform definitions in the level of the current transform definition are not completed, then the process returns to Position Definition Pointer Step 710. All of the sub-elements of a compound transform definition are transformed before the compound transform definition is considered completed. For example, when sub-definitions of the compound transform definition shown in FIG. 4A lines 28 through 46 are being processed, End of Element Step 770 will return a value of YES only when all of the sub-definitions shown on FIG. 4A lines 29 through 37 are processed. Typically, this will have occurred when the end tag at FIG. 4A line 46 is reached by the definition pointer. Likewise, the compound transform definition beginning at FIG. 4A line 37 is not completed until the sub-definitions of lines 38 through 44 are completed.

FIGS. 3A-3F, 4A-4B and 5A-5D illustrate many of the transformations found in various embodiments of the invention. In one illustrative example, Transform Engine 150 uses Active XML 160 illustrated in FIGS. 4A-4B to perform the process illustrated by FIG. 7. In one invocation of this process, Position Definition Pointer Step 710 results in the definition pointer pointing at the compound definition LM_PERSON starting at FIG. 4A line 16. The data included in this compound definition continues through FIG. 4B line 72. In Read Transform definition Step 720, "LM_PERSON class="R" source_record='PERSON'" is read from Active XML 160. In Position Payload Pointer Step 730, the definition pointer associated with the current process is incremented until it points to FIG. 3C line 146, wherein the associated source_record is found. In Compound Definition Step 750 it is determined that the transform definition read in Read Transform definition Step 720 is a compound definition. This is optionally accomplished by examining the class parameter which has a value of "R." The current process therefore proceeds to Recursive Call Step 760, wherein a new process configured to perform the steps shown in FIG. 7 is spawned. The previous current process is a parent process to the new process. The new process is optionally associated with a new payload pointer and a new definition pointer that will be considered the current pointers by steps in the new process.

In some embodiments, during the first execution of the process of FIG. 7, the payload pointer and definition pointer will be positioned at FIG. 3C line 147 and FIG. 4A line 17 after Position Definition Pointer Step 710 and Position Payload Pointer Step 730 are executed, respectively. Since the transform definitions from FIG. 4A line 17 through FIG. 4A line 27 are simple transform definitions, the process of FIG. 7 will loop through Perform Transformation Step 760 and End of Element Step 770 until the compound transform definition at FIG. 4A line 28 is reached. At this transform definition, a new process is invoked to apply the sub-definitions within the compound definition LM_PERSON_EFFDT. The end of the LM_PERSON_EFFDT compound definition is reached and the new process is terminated at FIG. 4A line 46. Termination occurs when End of Element Step 770 results in "YES" and Return Step 780 is executed. The parent process continues with the transform definition at FIG. 4A line 47.

In this illustrative example each Recursive Call Step 760 spawns a new process. This is typical of embodiments wherein parallel processing is available. Using parallel processing, a parent process can continue to the next transform definition at the same level without waiting for a daughter process to return. Thus, in the above example, if the new process is executed in parallel with its parent process, then the transform definition at FIG. 4A line 29 may be processed concurrently with transform definition at FIG. 4A line 47. In alternative embodiments, each Recursive Call Step 760 does not spawn a new process. In these embodiments, a single process calls computer instructions configured to perform the step shown in FIG. 7 in a recursive manner and a single pair of payload pointer and definition pointer are optionally used.

In some embodiments, Transform Engine 150 is used to create new elements in the transformed data. For example, in the embodiment of Active XML 160 illustrated in FIGS. 4A-4B, a transform definition for creating a new simple element in the transformed data output is found on FIG. 4A line 34. As discussed further herein, this transform definition results in the new simple element shown in FIG. 5B line 93.

In another example, in the embodiment of Active XML 160 illustrated in FIGS. 4A-4B, the transform definition for creating a new compound element in the transformed data output is found on FIG. 4B lines 68 through 71. These lines define a compound data element LM_PERSON_OPRID including sub-elements LM_PERSON_ID and OPRID. The empty value for source_record in FIG. 4B line 68 indicates that this compound element is not dependent on a record within the data to be transformed. The field LM_PERSON_ID is specified to have a default value of "0" and the OPRID field is specified to be of type CHAR without a non-NULL default value. In the transformed data output the resulting data is shown at FIG. 5C lines 153 through 156.

In some embodiments, Transform Engine 150 is configured to change the order or hierarchy of data elements. For example, the order of sub-elements within a record may be sorted differently in Active XML 160 than in the data to be transformed. The order found in Active XML 160 is reflected in the transformed data output.

In some embodiments, Transform Engine 150 is configured to merge data elements. For example, the transform definition shown in FIG. 4A lines 53 and 54 includes both a source_field and a source_record. The indication of a source_record overrides the default source record ADDRESSES for the current transform definition as indicated in FIG. 4A line 47. The resulting transformed data output is illustrated at FIG. 5C lines 117 and 134. The data element of FIG. 3F line 307 had been merged with the compound element starting at FIG. 3E line 239.

In some embodiments, Transform Engine 150 is configured to nest data elements. For example, in Payload Data 230 as shown in FIGS. 3A-3F there are two compound elements PERS_DATA_EFFDT and NAMES at the same hierarchical level (See FIG. 3C lines 157 through FIG. 3D line 207 and FIG. 3D line 211 through FIG. 3E line 235, respectively). In the Active XML 160 of FIGS. 4A and 4B the source_record NAMES is used to define a sub-element of new record LM_PERSON_EFFDT which is based on the source_record PERS_DATA_EFFDT (See FIG. 4A lines 37 and 28, respectively). In the transformed data output data that was at the same hierarchical level in Payload Data 230 are now nested in the new compound element LM_PERSON_EFFDT (See FIG. 5B at line 87).

In some embodiments, Transform Engine 150 is configured to un-nest data elements found in Payload Data 230. In this process an element at a lower level in the data structure of Payload Data 230 is placed at a higher lever in the transformed data output. In this process a compound element can become a sibling (same hierarchical level) element to one of its former sub-elements, thus flattening the data structure. For example, the Payload Data 230 shown in FIG. 3F line 293 includes a sub-element PERS_NID of compound element PERSON (starting on FIG. 3C line 146). In the Active XML 160 illustrated in FIG. 4A line 16 and FIG. 4B line 73 these data elements are used in defining new elements LM_PERSON (FIG. 5C line 75) and LM_PERS_NID (FIG. 5D line 169) at the same hierarchical level.

In alternative embodiments, un-nesting is accomplished by specifying both a compound element and a sub-element of that compound element within a source_record or source_field. For example, one embodiment of Active XML 160 includes LM_FLATTENED_ID type="CHAR" source_field="PERSON.STUDENT_ID", where PERSON is a compound element in the data to be transformed and STUDENT_ID is a sub-element of PERSON.

As illustrated herein, the transformations defined by Active XML 160 optionally include changing the names (namespace) of simple elements and compounds. In various embodiments the same approach is used to change the namespace of an entire Meta-language Transform Input Data 200. For example, the transform definition included in FIG. 4A lines 14 and 15 are configured to change the name of the message within Payload Data 230 from PERSON_BASIC_FULLSYNC to LM_PERSON_BASIC_FULLSYNC.

In various embodiments, transform definitions, included in Active XML 160, include further advanced functions configured to perform logic operations. For example, in some embodiments, value translation optionally includes a call to a function. The Active XML 160 illustrated in FIGS. 4A-4B includes a function call at FIG. 4A line 55 and FIG. 4B line 56. The parameter "translation_codeset" is used to specify a function labeled COUNTRY_CODESET. The definition of this function is typically found elsewhere in Active XML 160. In the illustrated example the definition is at FIG. 4B lines 80 through 87. The value of the element COUNTRY ("USA") is passed to this function from Payload Data 230 at FIG. 3E lines 244 or 271. Using the computer instructions included in FIG. 4B lines 80 through 87, the value USA is transformed to "United States of America" and a new leaf element is created for STATE that holds the transformed value "California." The translation_codeset COUNTRY_CODESET includes a call to an external codeset PS_COUNTRY__01. (PS_COUNTRY__01 is, for example, a pointer to a function or a lookup table.) Through this call, or similar calls, Active XML 160 can invoke a variety of dynamic internal or external operations to process the data to be transformed.

For example, in some embodiments, Data Interpreter 120 is used as a security filter that restricts communication of selected data elements to or from Application 130. In these embodiments, external operations are optionally used to confirm user or device identity and/or the Active XML 160 derived from Transform Schema 170 is responsive to the user or device identity.

Several embodiments are specifically illustrated and/or described herein. However, it will be appreciated that modifications and variations are covered by the above teachings and within the scope of the appended claims without departing from the spirit and intended scope thereof. For example, the transform definitions are optionally configured in a hierarchical data format other than XML and the structures of Payload Data 230 do not have to be nested and/or hierarchical.

We claim:

1. A method of transforming data, the method comprising:

positioning a definition pointer to point at a first compound transform definition within a transform definition file;

invoking a first parallel processing thread to read the pointed at first compound transform definition;

searching data to be transformed for a data element to be transformed, the search being responsive to the first compound transform definition;

calling a dynamic function defined in the transform definition file, the dynamic function located elsewhere in the transform definition file from the definition pointer position;

transforming any found data element into an output data file, responsive to the first compound transform definition and called dynamic function, a data structure of the output data file being responsive to a data structure of the first compound transform definition;

determining a type of the read first compound transform definition;

based on a determination that the first compound transform definition is compound, processing each sub-definition of the read first compound transform definition by repeating the positioning, invoking, searching, calling, and transforming for each sub-definition in order to transform each sub-definition recursively, wherein the data elements transformation includes nesting of a data element;

determining if all sub-definitions of the first compound transform definition have been processed;

positioning a definition pointer to point at a second compound transform definition within the transform definition file;

invoking a second parallel processing thread to read the pointed at second compound transform definition;

searching data to be transformed for another data element to be transformed, the search being responsive to the second compound transform definition;

transforming any found data element into the output data file, responsive to the second compound transform definition, the data structure of the output data file being responsive to the data structure of the second compound transform definition; and if no data element is found to be transformed, adding one or more output data elements to the output data file responsive to the read first compound transform definition, the data to be transformed having no contribution to the output data element.

2. The method of claim 1, wherein the read first compound transform definition includes a value parameter configured to specify a value for inclusion in the output data file.

3. The method of claim 1, wherein the data element is a compound data element and the read transform definition includes a source record parameter configured to specify the compound data element.

4. The method of claim 1, wherein the read first compound transform definition is in a meta-language format.

5. The method of claim 1, wherein the data to be transformed data is in a meta-language data format.

6. The method of claim 1, wherein the read first compound transform definition includes a transform element having an output field name and a source field parameter.

7. The method of claim 1, wherein the read first compound transform definition includes a value parameter configured to populate a field in the output data file.

8. A method of transforming data, the method comprising:

positioning a definition pointer to point at a first compound transform definition, the first compound transform definition being within a transform definition file;

invoking a first parallel processing thread to read the pointed at first compound transform definition and sub-definitions of the first compound transform definition;

positioning a first payload pointer to point at a first data element to be transformed, the positioning of the first payload pointer being responsive to a data structure of the first compound transform definition;

calling a dynamic function defined in the transform definition file, the dynamic function located elsewhere in the transform definition file from the definition pointer position;

transforming the first data element into an output data file, responsive to the read first compound transform definition and called dynamic function;

determining a type of the read first compound transform definition;

based on a determination that the first compound transform definition is compound, processing each sub-definition of the read first compound transform definition by repeating the positioning, invoking, positioning, calling, and transforming for each sub-definition in order to transform each sub-definition recursively, wherein the data elements transformation includes nesting of a data element;

determining if all sub-definitions of the first compound transform definition have been processed;

positioning the definition pointer to point at a second compound transform definition, the second compound transform definition being within the transform definition file;

invoking a second parallel processing thread to read the pointed at second compound transform definition and sub-definitions of the second compound transform definition;

positioning a second payload pointer to point at a second data element to be transformed, the positioning of the second payload pointer being responsive to a data structure of the second compound transform definition;

transforming the second data element into the output data file, responsive to the read second compound transform definition; and if no first or second data element is found to be transformed, adding one or more output data elements to the output data file responsive to the read first compound transform definition, the data to be transformed having no contribution to the output data element.

9. The method of claim 8, further including determining if all sub-elements of a compound element have been transformed and, if the determination returns a value of YES, returning to a calling process.

10. The method of claim 8, further including un-nesting the data element to be transformed.

11. The method of claim 8, wherein the read first compound transform definition includes a source field parameter configured to specify the data element.

12. The method of claim 8, wherein the read first compound transform definition includes a source record parameter configured to specify the compound data element.

13. The method of claim 8, wherein the transform definition file includes a tree data structure.

14. A computer readable storage media having embodied thereon data, the data comprising:

computer instructions configured to position a definition pointer to point at a first compound transform definition, the first compound transform definition being within a transform definition file;

computer instructions configured to invoke a first parallel processing thread to read the pointed at first compound transform definition and sub-definitions of the first compound transform definition;

computer instructions configured to position a first payload pointer to point at a first data element to be transformed, the positioning being responsive to a data structure of the first compound transform definition;

computer instructions configured to call a dynamic function defined in the transform definition file, the dynamic function located elsewhere in the transform definition file from the definition pointer position;

computer instructions configured to transform the first data element into an output data file, responsive to the read first compound transform definition and called dynamic function;

computer instructions configured to determine a type of the read first compound transform definition;

based on a determination that the first compound transform definition is compound, computer instructions configured to process each sub-definition of the read first compound transform definition by repeating the positioning, invoking, positioning, calling, and transforming for each sub-definition in order to transform each sub-definition recursively, wherein the data elements transformation includes nesting;

computer instructions configured to determine if all sub-definitions of the first compound transform definition have been processed;

computer instructions configured to position a second payload pointer to point at a second data element to be transformed, the positioning being responsive to a data structure of the second compound transform definition;

computer instructions configured to invoke a second parallel processing thread to read the pointed at second compound transform definition and sub-definitions of the second compound transform definition; and computer instructions configured to transform the second data element into the output data file, responsive to the read second compound transform definition;

if no first or second data element is found to be transformed, computer instructions configured to add one or more output data elements to the output data file responsive to the read first compound transform definition, the data to be transformed having no contribution to the output data element.

15. An application system comprising:

a computing device comprising:

a memory; and at least one processor operatively coupled to the memory, the at least one processor configured to:

position a definition pointer to point at a first compound transform definition within a transform definition file;

invoke a first parallel processing thread to read the pointed at first compound transform definition;

search data to be transformed for a data element to be transformed, the search being responsive to the first compound transform definition;

call a dynamic function defined in the transform definition file, the dynamic function located elsewhere in the transform definition file from the definition pointer position;

transform any found data element into an output data file, responsive to the first compound transform definition and called dynamic function, a data structure of the output data file being responsive to a data structure of the first compound transform definition;

determine a type of the read first compound transform definition;

based on a determination that the first compound transform definition is compound, process each sub-definition of the read first compound transform definition by repeating the positioning, invoking, searching, calling, and transforming for each sub-definition in order to transform the each sub-definition recursively, wherein the data elements transformation includes nesting of a data element;

determine if all sub-definitions of the first compound transform definition have been processed;

position a definition pointer to point at a second compound transform definition within the transform definition file;

invoke a second parallel processing thread to read the pointed at second compound transform definition;

search data to be transformed for another data element to be transformed, the search being responsive to the second compound transform definition;

transform any found data element into the output data file, responsive to the second compound transform definition, the data structure of the output data file being responsive to the data structure of the second compound transform definition; and if no data element is found to be transformed, add one or more output data elements to the output data file responsive to the read first compound transform definition, the data to be transformed having no contribution to the output data element.

16. The application system of claim 15, wherein the at least one processor is further configured to select the transform definition file from a set of transform definitions files, responsive to data associated with the data to be transformed.

17. The application system of claim 15, wherein the at least one processor is further configured to add data to the output data file, the added data being configured responsive to the transform definition file and having no contribution from the data to be transformed.

* * * * *

UNITED STATES PATENT AND TRADEMARK OFFICE

CERTIFICATE OF CORRECTION

PATENT NO. : 7,970,779 B2
APPLICATION NO. : 10/661167
DATED : June 28, 2011
INVENTOR(S) : Smirnov et al.

It is certified that error appears in the above-identified patent and that said Letters Patent is hereby corrected as shown below:

In column 14, line 24, delete "lever" and insert -- level --, therefor.

In column 16, line 44, in Claim 8, after "invoking," delete "positioning," and insert -- searching, --, therefor.

In column 17, line 47, in Claim 14, after "invoking," delete "positioning," and insert -- searching, --, therefor.

In column 17, line 61, in Claim 14, after "definition;" delete "and".

In column 17, line 64, in Claim 14, after "definition;" insert -- and --.

Signed and Sealed this
Fifteenth Day of November, 2011

David J. Kappos
*Director of the United States Patent and Trademark Office*